US009230547B2

(12) United States Patent
Wilder et al.

(10) Patent No.: US 9,230,547 B2
(45) Date of Patent: Jan. 5, 2016

(54) METADATA EXTRACTION OF NON-TRANSCRIBED VIDEO AND AUDIO STREAMS

(71) Applicant: DATASCRIPTION LLC, Beverly Hills, CA (US)

(72) Inventors: Jonathan Wilder, Miami, FL (US); Kenneth Deangelis, Jr., Beverly Hills, CA (US); Maurice W. Schonfeld, New York, NY (US)

(73) Assignee: DATASCRIPTION LLC, Beverly Hills, CA (US)

( * ) Notice: Subject to any disclaimer, the term of this patent is extended or adjusted under 35 U.S.C. 154(b) by 0 days.

(21) Appl. No.: 14/719,125

(22) Filed: May 21, 2015

(65) Prior Publication Data

US 2015/0255066 A1      Sep. 10, 2015

Related U.S. Application Data

(63) Continuation-in-part of application No. 14/328,620, filed on Jul. 10, 2014, now abandoned.

(60) Provisional application No. 61/844,597, filed on Jul. 10, 2013.

(51) Int. Cl.
*G10L 15/26* (2006.01)
*G06K 9/00* (2006.01)

(52) U.S. Cl.
CPC ............ *G10L 15/26* (2013.01); *G06K 9/00744* (2013.01); *G06K 2209/27* (2013.01); *G10L 15/265* (2013.01)

(58) Field of Classification Search
CPC ........... G06K 2209/27; G06K 9/00744; G10L 15/265; G10L 15/26
See application file for complete search history.

(56) References Cited

U.S. PATENT DOCUMENTS

| 8,447,604 | B1 | 5/2013 | Chang |
| 8,533,208 | B2 | 9/2013 | Sundaresan et al. |
| 2011/0035211 | A1 | 2/2011 | Eden |
| 2012/0259975 | A1 | 10/2012 | Le et al. |
| 2013/0166303 | A1 | 6/2013 | Chang et al. |
| 2013/0211826 | A1 | 8/2013 | Mannby |
| 2014/0201187 | A1 | 7/2014 | Larson |

*Primary Examiner* — Angela A Armstrong
(74) *Attorney, Agent, or Firm* — Im IP Law PLLC; C. Andrew Im

(57) ABSTRACT

A system and computer based method for transcribing and extracting metadata from a source media. A processor-based server extracts audio and video stream from the source media. A speech recognition engine processes the audio and/or video stream to transcribe the audio and/or video stream into a time-aligned textual transcription and to extract audio amplitude by time interval, thereby providing a time-aligned machine transcribed media. The server processor measures the aural amplitude of the extracted audio amplitude and assigns a numerical value that is normalized to a single, normalized, universal amplitude scale. A database stores the time-aligned machine transcribed media, time-aligned video frames and the assigned value from the normalized amplitude scale.

30 Claims, 13 Drawing Sheets

METADATA EXTRACTION OF NON-TRANSCRIBED VIDEO AND AUDIO STREAMS

RELATED APPLICATION

This application is a continuation-in-part application of U.S. application Ser. No. 14/328,620 filed Jul. 10, 2014, which claims the benefit of U.S. Provisional Application No. 61/844,597 filed Jul. 10, 2013, each of which is incorporated herein by reference in its entirety.

BACKGROUND OF THE INVENTION

The invention relates to audio/video/imagery processing, more particularly to audio/video/imagery metadata extraction and analytics.

Extraction and analysis of non-transcribed media has typically been a labor-intensive process, typically human driven, which does not allow for extensive and consistent metadata extraction in rapid fashion. One or more person has to view and listen to the source media, e.g., audio and/or video content, and manually transcribe the corresponding audio to generate an index of what took place and when, or to generate closed captioning text that is synchronized to the video. To manually locate and record a timestamp for even a small fraction of the speech and script elements often requires several hours of manual work, and doing this for the entire source media may require several days or more.

Currently available systems and methods deal with the extraction and analysis of transcribed media. Currently available systems and methods time-match a written script text to raw speech transcript produced from an analysis of recorded dialog to ensure accuracy of the transcript. That is, transcribed source media is processed and the resulting speech recognized transcript is compared to the written script to ensure accuracy. Such transcripts are used in movie industry and video production environment to search or index video/audio content based on the text provided in the written script. Also, aligned transcript can be used to generate closed caption text that is synchronized to actual spoken dialog in the source media.

These automated techniques for time-synchronizing scripts and corresponding video to pre-existing written script typically utilize a word alignment matrix (e.g., script words vs. transcript words). But, they are traditionally slow and error-prone. These techniques often require a great deal of processing and may contain a large number of errors, rendering the output inaccurate. For example, due to noise or other non-dialogue artifacts, in speech-to-text transcripts the wrong time values, off by several minutes or more, are often assigned to script text. As a result, the transcript may not be reliable, thereby requiring additional time to identify and correct the errors, or causing users to shy away from its use altogether.

The problems are exacerbated when one must extract non-transcribed media because there is no written script to compare the speech transcript for accuracy.

Accordingly, it is desirable to provide a technique for providing efficient and accurate time-aligned machine transcribed media that is normalized to a single universal amplitude scale. That is, the claimed invention proceeds upon the desirability of providing method and system for storing and applying automated machine speech and facial/entity recognition to large volumes of non-transcribed video and/or audio media streams to provide searchable transcribed content that is normalized to a single universal amplitude scale. The searchable transcribed content can be searched and analyzed for metadata to provide a unique perspective onto the data via server-based queries.

OBJECTS AND SUMMARY OF THE INVENTION

An object of the claimed invention is to provide a system and method that transcribes and normalizes non-transcribed media, which can include audio, video and/or imagery, to a single universal amplitude scale.

Another object of the claimed invention is to provide aforesaid system and method that analyzes the non-transcribed media frame by frame.

A further object of the claimed invention is to provide aforesaid system and method that extracts metadata relating to sentiment, psychology, socioeconomic and image recognition traits.

In accordance with an exemplary embodiment of the claimed invention, a computer based method is provided for transcribing and extracting metadata from a source media. A processor-based server extracts an audio stream from the source media and normalizes the audio stream to a single universal amplitude scale by generating an audio histogram. The processor-based server determines a loudest frame of the audio stream with the loudest sound and a softest frame of the audio stream with the softest sound. A normalized minimum amplitude value is assigned to the softest frame and a normalized maximum amplitude value is assigned to the loudest frame. Each frame of the audio stream is then compared to the loudest frame and to the softest frame by utilizing the audio histogram, and assigned a normalized amplitude value between the normalized minimum and maximum values in accordance with the comparison result. The normalized amplitude value is stored for each frame of the audio stream in a database.

In accordance with an exemplary embodiment of the claimed invention, the aforesaid audio stream is processed by a speech recognition engine to transcribe the audio stream into a time-aligned textual transcription, thereby providing a time-aligned machine transcribed media. The server processor process the time-aligned machine transcribed media to extract time-aligned textual metadata associated with the source media. The time-aligned machine transcribed media and the time-aligned textual metadata are stored in the database.

In accordance with an exemplary embodiment of the claimed invention, the aforesaid method performs a textual sentiment analysis on a full or a segment of the time-aligned textual transcription by the server processor to extract time-aligned sentiment metadata. Database lookups are performed based on predefined sentiment weighed texts stored in the database. One or more matched time-aligned sentiment metadata is received from the database by the server processor.

In accordance with an exemplary embodiment of the claimed invention, the aforesaid method performs a natural language processing on a full or a segment of the time-aligned textual transcription by the server processor to extract time-aligned natural language processed metadata related to at least one of the following: an entity, a topic, a key theme, a subject, an individual, and a place. Database lookups are performed based on predefined natural language weighed texts stored in the database. One or more matched time-aligned natural language metadata is received from the database by the server processor.

In accordance with an exemplary embodiment of the claimed invention, the aforesaid method performs a demographic estimation processing on a full or a segment of the time-aligned textual transcription by the server processor to extract time-aligned demographic metadata. Database lookups are performed based on predefined word/phrase demographic associations stored in the database. One or more matched time-aligned demographic metadata is received from the database by the server processor.

In accordance with an exemplary embodiment of the claimed invention, the aforesaid method performs a psychological profile estimation processing on a full or a segment of the time-aligned textual transcription by the server processor to extract time-aligned psychological metadata. Database lookups are performed based on predefined word/phrase psychological profile associations stored in the database. One or more matched time-aligned psychological metadata is received from the database by the server processor.

In accordance with an exemplary embodiment of the claimed invention, the aforesaid method performs at least one of the following: a textual sentiment analysis on the time-aligned machined transcribed media by the server processor to extract time-aligned sentiment metadata; a natural language processing on the time-aligned machined transcribed media by the server processor to extract time-aligned natural language processed metadata related to at least one of the following: an entity, a topic, a key theme, a subject, an individual, and a place; a demographic estimation processing on the time-aligned machined transcribed media by the server processor to extract time-aligned demographic metadata; and a psychological profile estimation processing on the time-aligned machined transcribed media by the server processor to extract time-aligned psychological metadata.

In accordance with an exemplary embodiment of the claimed invention, the aforesaid method extracts a video stream from the source media by a video frame engine of the processor-based server. The time-aligned video frames are extracted from the video stream by the video frame engine. The time-aligned video frames are stored in the database. The time-aligned video frames are processed by a server processor to extract time-aligned visual metadata associated with the source media.

In accordance with an exemplary embodiment of the claimed invention, the aforesaid method generates digital advertising based on one or more time-aligned textual metadata associated with the source media.

In accordance with an exemplary embodiment of the claimed invention, a computer based method is provided for converting and extracting metadata from a source media comprising both audio and video streams. A processor-based server extracts the audio stream from the source media and normalizes the audio stream to a single universal amplitude scale by generating an audio histogram. The processor-based server determines a loudest frame of the audio stream with the loudest sound and a softest frame of the audio stream with the softest sound. A normalized minimum amplitude value is assigned to the softest frame and a normalized maximum amplitude value is assigned to the loudest frame. Each frame of the audio stream is then compared to the loudest frame and to the softest frame by utilizing the audio histogram, and assigned a normalized amplitude value between the normalized minimum and maximum values in accordance with the comparison result. A video frame engine of a processor-based server extracts the video stream from the source media and processes the time-aligned video frames to extract time-aligned visual metadata associated with the source media. The normalized amplitude value, time-aligned video frames, and time-aligned visual metadata are stored in a database.

In accordance with an exemplary embodiment of the claimed invention, the aforesaid method performs an optical character recognition (OCR) analysis on the time-aligned video frames by the server processor to extract time-aligned OCR metadata. Texts are extracted from graphics by a timed interval from the time-aligned video frames. Database lookups are preformed based on a dataset of predefined recognized fonts, letters and languages stored in the database. One or more matched time-aligned OCR metadata is received from the database by the server processor.

In accordance with an exemplary embodiment of the claimed invention, the aforesaid method performs a facial recognition analysis on the time-aligned video frames by the server processor to extract time-aligned facial recognition metadata. Facial data points are extracted by a timed interval from the time-aligned video frames. Database lookups are performed based on a dataset of predefined facial data points for individuals stored in the database. One or more matched time-aligned facial metadata is received from the database by the server processor.

In accordance with an exemplary embodiment of the claimed invention, the aforesaid method performs an object recognition analysis on the time-aligned video frames by the server processor to extract time-aligned object recognition metadata. Object data points are extracted by a timed interval from the time-aligned video frames. Database lookups are performed based on a dataset of predefined object data points for a plurality of objects stored in the database. One or more matched time-aligned object metadata is received from the database by the server processor.

In accordance with an exemplary embodiment of the claimed invention, the aforesaid method performs at least one of the following: an optical character recognition (OCR) analysis on the time-aligned video frames by the server processor to extract time-aligned OCR metadata; a facial recognition analysis on the time-aligned video frames by the server processor to extract time-aligned facial recognition metadata; and an object recognition analysis on the time-aligned video frames by the server processor to extract time-aligned object recognition metadata.

In accordance with an exemplary embodiment of the claimed invention, a non-transitory computer readable medium comprising computer executable code for transcribing and extracting metadata from a source media is provided. A processor-based server is instructed to extract an audio stream from the source media and to normalize the audio stream to a single universal amplitude scale by generating an audio histogram. The processor-based server is instructed to determine a loudest frame of the audio stream with the loudest sound and a softest frame of the audio stream with the softest sound. The processor-based server is instructed to assign a normalized minimum amplitude value to the softest frame and a normalized maximum amplitude value to the loudest frame. Each frame of the audio stream is then compared to the loudest frame and to the softest frame by utilizing the audio histogram, and assigned a normalized amplitude value between the normalized minimum and maximum values in accordance with the comparison result. A database is instructed to store the normalized amplitude value for each frame of the audio stream.

In accordance with an exemplary embodiment of the claimed invention, the aforesaid computer executable code further comprises instructions for a speech recognition engine to process the audio stream to transcribe the audio stream into a time-aligned textual transcription to provide a time-aligned machine transcribed media. The server processor is instructed to process the time-aligned machine transcribed media to extract time-aligned textual metadata associated with the source media. The database is instructed to store the time-aligned machine transcribed media and the time-aligned textual metadata.

In accordance with an exemplary embodiment of the claimed invention, the aforesaid computer executable code further comprises instructions for performing a textual sentiment analysis on a full or a segment of the time-aligned textual transcription by the server processor to extract time-aligned sentiment metadata. Database lookups are performed based on predefined sentiment weighed texts stored in the database. One or more matched time-aligned sentiment metadata is received from the database by the server processor.

In accordance with an exemplary embodiment of the claimed invention, the aforesaid computer executable code further comprises instructions for performing a natural language processing on a full or a segment of the time-aligned textual transcription by the server processor to extract time-aligned natural language processed metadata related to at least one of the following: an entity, a topic, a key theme, a subject, an individual, and a place. Database lookups are performed based on predefined natural language weighed texts stored in the database. One or more matched time-aligned natural language metadata is received from the database by the server processor.

In accordance with an exemplary embodiment of the claimed invention, the aforesaid computer executable code further comprises instructions for performing a demographic estimation processing on a full or a segment of the time-aligned textual transcription by the server processor to extract time-aligned demographic metadata. Database lookups are performed based on predefined word/phrase demographic associations stored in the database. One or more matched time-aligned demographic metadata is received from the database by the server processor.

In accordance with an exemplary embodiment of the claimed invention, the aforesaid computer executable code further comprises instructions for performing a psychological profile estimation processing on a full or a segment of the time-aligned textual transcription by the server processor to extract time-aligned psychological metadata. Database lookups are performed based on predefined word/phrase psychological profile associations stored in the database. One or more matched time-aligned psychological metadata from the database by the server processor.

In accordance with an exemplary embodiment of the claimed invention, the aforesaid computer executable code further comprises instructions for generating digital advertising based on one or more time-aligned textual metadata associated with the source media.

In accordance with an exemplary embodiment of the claimed invention, the aforesaid computer executable code further comprises instructions for extracting a video stream from the source media by a video frame engine of a processor-based server. Time-aligned video frames are extracted from the video stream by the video frame engine. The time-aligned video frames are stored in the database. The time-aligned video frames are processed by a server processor to extract time-aligned visual metadata associated with the source media.

In accordance with an exemplary embodiment of the claimed invention, the aforesaid computer executable code further comprises instructions for optical character recognition (OCR) analysis on the time-aligned video frames by the server processor to extract time-aligned OCR metadata. Texts are extracted from graphics by a timed interval from the time-aligned video frames. Database lookups are performed based on a dataset of predefined recognized fonts, letters and languages stored in the database. One or more matched time-aligned OCR metadata from the database by the server processor.

In accordance with an exemplary embodiment of the claimed invention, the aforesaid computer executable code further comprises instructions for performing a facial recognition analysis on the time-aligned video frames by the server processor to extract time-aligned facial recognition metadata. Facial data points are extracted by a timed interval from the time-aligned video frames. Database lookups are performed based on a dataset of predefined facial data points for individuals stored in the database. One or more matched time-aligned facial metadata is received from the database by the server processor.

In accordance with an exemplary embodiment of the claimed invention, the aforesaid computer executable code further comprises instructions for performing an object recognition analysis on the time-aligned video frames by the server processor to extract time-aligned object recognition metadata. Object data points are extracted by a timed interval from the time-aligned video frames. Database lookups are performed based on a dataset of predefined object data points for a plurality of objects stored in the database. One or more matched time-aligned object metadata is received from the database by the server processor.

In accordance with an exemplary embodiment of the claimed invention, a system for transcribing and extracting metadata from a source media is provided. A processor based server is connected to a communications system for receiving and extracting an audio stream from the source media. A processor-based server extracts an audio stream from the source media and normalizes the audio stream to a single universal amplitude scale by generating an audio histogram. The processor-based server determines a loudest frame of the audio stream with the loudest sound and a softest frame of the audio stream with the softest sound. A normalized minimum amplitude value is assigned to the softest frame and a normalized maximum amplitude value is assigned to the loudest frame. Each frame of the audio stream is then compared to the loudest frame and to the softest frame by utilizing the audio histogram, and assigned a normalized amplitude value between the normalized minimum and maximum values in accordance with the comparison result. The normalized amplitude value is stored for each frame of the audio stream in a database.

In accordance with an exemplary embodiment of the claimed invention, a speech recognition engine of the aforesaid server process the audio stream to transcribe the audio stream into a time-aligned textual transcription, thereby providing a time-aligned machine transcribed media. A server processor processes the time-aligned machine transcribed media to extract time-aligned textual metadata associated with the source media. A database stores the time-aligned machine transcribed media and the time-aligned textual metadata associated with the source media.

In accordance with an exemplary embodiment of the claimed invention, the aforesaid server processor performs a textual sentiment analysis on a full or a segment of the time-aligned textual transcription to extract time-aligned sentiment metadata. The server processor performs database lookups based on predefined sentiment weighed texts stored in the database, and receives one or more matched time-aligned sentiment metadata from the database.

In accordance with an exemplary embodiment of the claimed invention, the aforesaid server processor performs a natural language processing on a full or a segment of the time-aligned textual transcription to extract time-aligned natural language processed metadata related to at least one of the following: an entity, a topic, a key theme, a subject, an individual, and a place. The server processor performs database lookups based on predefined natural language weighed texts stored in the database, and receives one or more matched time-aligned natural language metadata from the database.

In accordance with an exemplary embodiment of the claimed invention, the aforesaid server processor performs a demographic estimation processing on a full or a segment of the time-aligned textual transcription to extract time-aligned demographic metadata. The server processor performs database lookups based on predefined word/phrase demographic associations stored in the database, and receives one or more matched time-aligned demographic metadata from the database.

In accordance with an exemplary embodiment of the claimed invention, the aforesaid server processor performs a psychological profile estimation processing on a full or a segment of the time-aligned textual transcription to extract time-aligned psychological metadata. The server processor performs database lookups based on predefined word/phrase psychological profile associations stored in the database, and receives one or more matched time-aligned psychological metadata from the database.

In accordance with an exemplary embodiment of the claimed invention, the aforesaid server comprises a video frame engine for extracting a video stream from the source media. The server processor extracts time-aligned video frames from the video stream and process the time-aligned video frames to extract time-aligned visual metadata associated with the source media. The database stores the time-aligned video frames.

In accordance with an exemplary embodiment of the claimed invention, the aforesaid server processor performs one or more of the following analysis on the time-aligned video frames: an optical character recognition (OCR) analysis to extract time-aligned OCR metadata; a facial recognition analysis to extract time-aligned facial recognition metadata; and an object recognition analysis to extract time-aligned object recognition metadata. The server processor performs the OCR analysis by extracting texts from graphics by a timed interval from the time-aligned video frames; performing database lookups based on a dataset of predefined recognized fonts, letters and languages stored in the database; and receiving one or more matched time-aligned OCR metadata from the database. The server processor performs a facial recognition analysis by extracting facial data points by a timed interval from the time-aligned video frames; performing database lookups based on a dataset of predefined facial data points for individuals stored in the database; and receiving one or more matched time-aligned facial metadata from the database. The server processor performs an object recognition analysis by extracting object data points by a timed interval from the time-aligned video frames; performing database lookups based on a dataset of predefined object data points for a plurality of objects stored in the database; and receiving one or more matched time-aligned object metadata from the database by the server processor.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE EMBODIMENTS

Figure 1:
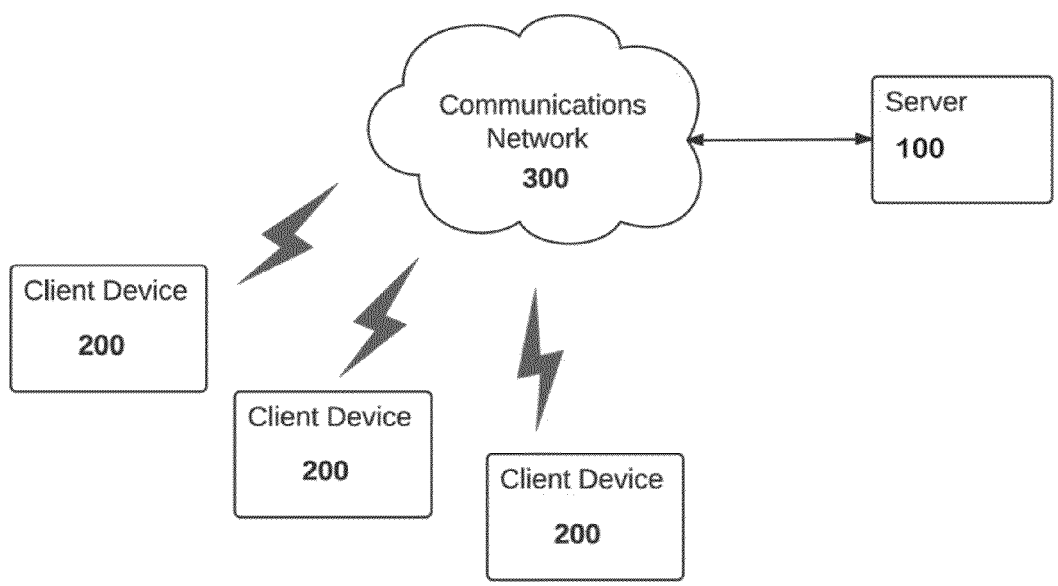
FIG. 1 is a block diagram of the system architecture in accordance with an exemplary embodiment of the claimed invention.
Figure 2A:
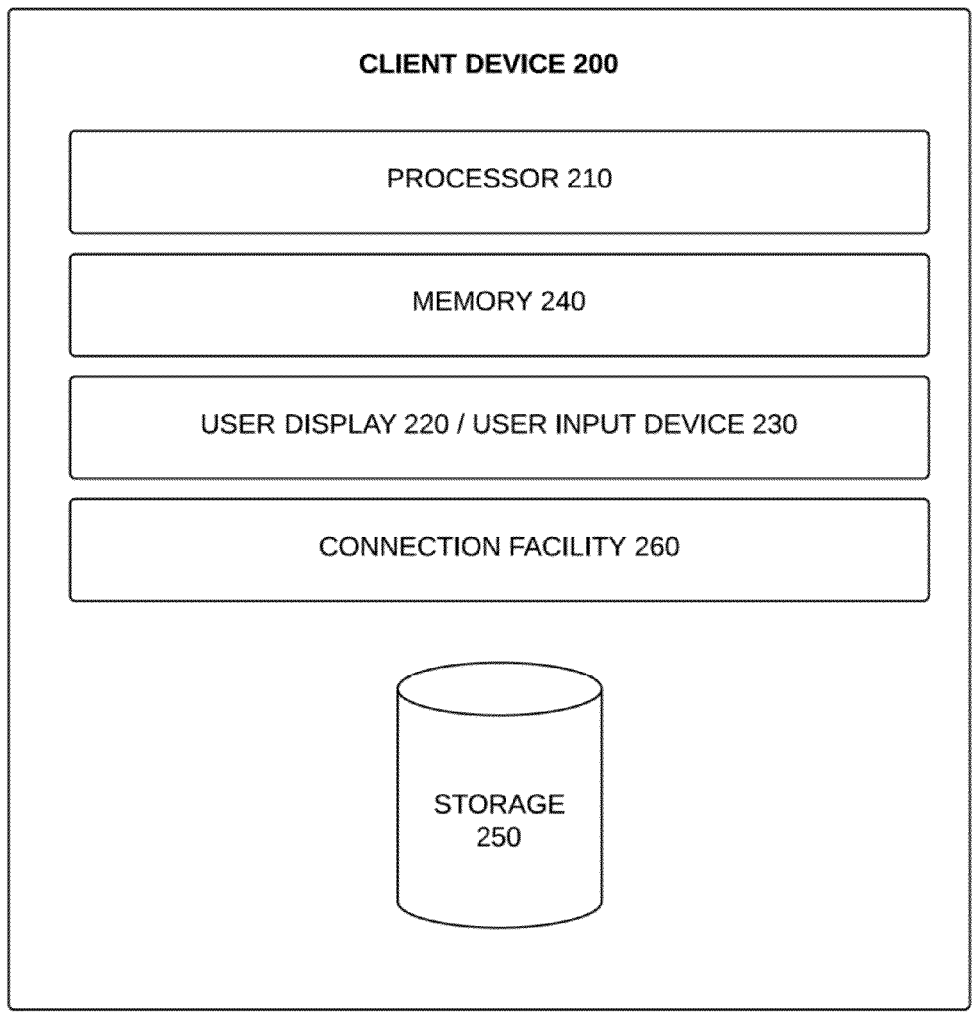
FIG. 2A is a block diagram of a client device in accordance with an exemplary embodiment of the claimed invention.
Figure 2B:
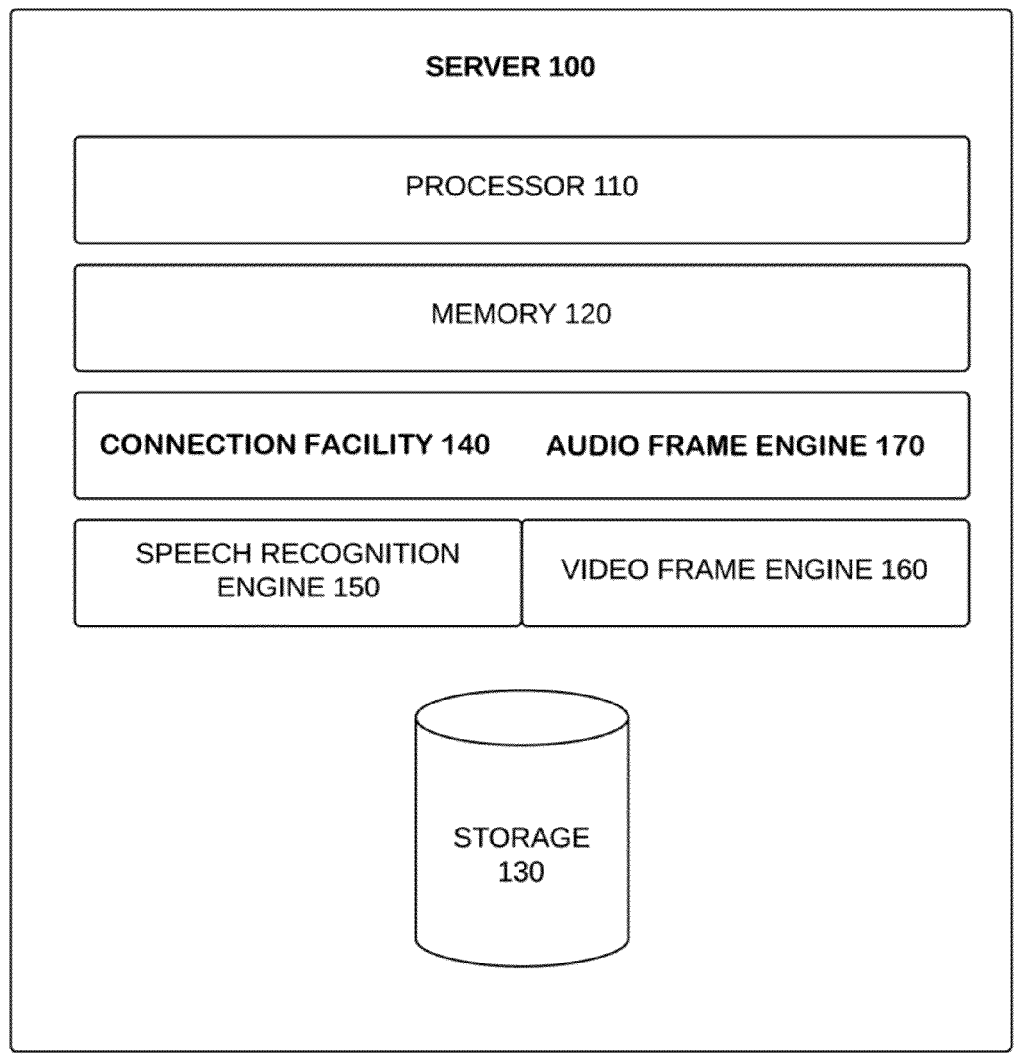
FIG. 2B is a block diagram of a server in accordance with an exemplary embodiment of the claimed invention.

As shown in FIG. 1, at the system level, the claimed invention comprises one or more web-enabled processor based client devices 200, one or more processor based servers 100, and a communications network 300 (e.g., Internet). In accordance with an exemplary embodiment of the claimed invention, as shown in FIG. 2A, each client device 200 comprises a processor or client processor 210, a display or screen 220, an input device 230 (which can be the same as the display 220 in the case of touch screens), a memory 240, a storage device 250 (preferably, a persistent storage, e.g., hard drive), and a network connection facility 260 to connect to the communications network 300.

In accordance with an exemplary embodiment of the claimed invention, the server 100 comprise a processor or server processor 110, a memory 120, a storage device 130 (preferably a persistent storage, e.g., hard disk, database, etc.), a network connection facility 140 to connect to the communications network 300, a speech recognition engine 150 and a video frame engine 160.

The network enabled client device 200 includes but is not limited to a computer system, a personal computer, a laptop, a notebook, a netbook, a tablet or tablet like device, an IPad® (IPAD is a registered trademark of Apple Inc.) or IPad like device, a cell phone, a smart phone, a personal digital assistant (PDA), a mobile device, or a television, or any such device having a screen connected to the communications network 300 and the like.

The communications network 300 can be any type of electronic transmission medium, for example, including but not limited to the following networks: a telecommunications network, a wireless network, a virtual private network, a public internet, a private internet, a secure internet, a private network, a public network, a value-added network, an intranet, a wireless gateway, or the like. In addition, the connectivity to the communications network 300 may be via, for example, by cellular transmission, Ethernet, Token Ring, Fiber Distributed Datalink Interface, Asynchronous Transfer Mode, Wireless Application Protocol, or any other form of network connectivity.

Moreover, in accordance with an embodiment of the claimed invention, the computer-based methods for implementing the claimed invention are implemented using processor-executable instructions for directing operation of a device or devices under processor control, the processor-executable instructions can be stored on a tangible computer-readable medium, such as but not limited to a disk, CD, DVD, flash memory, portable storage or the like. The processor-executable instructions can be accessed from a service provider's website or stored as a set of downloadable processor-executable instructions, for example or downloading and installation from an Internet location, e.g. the server 100 or another web server (not shown).

Figure 3:
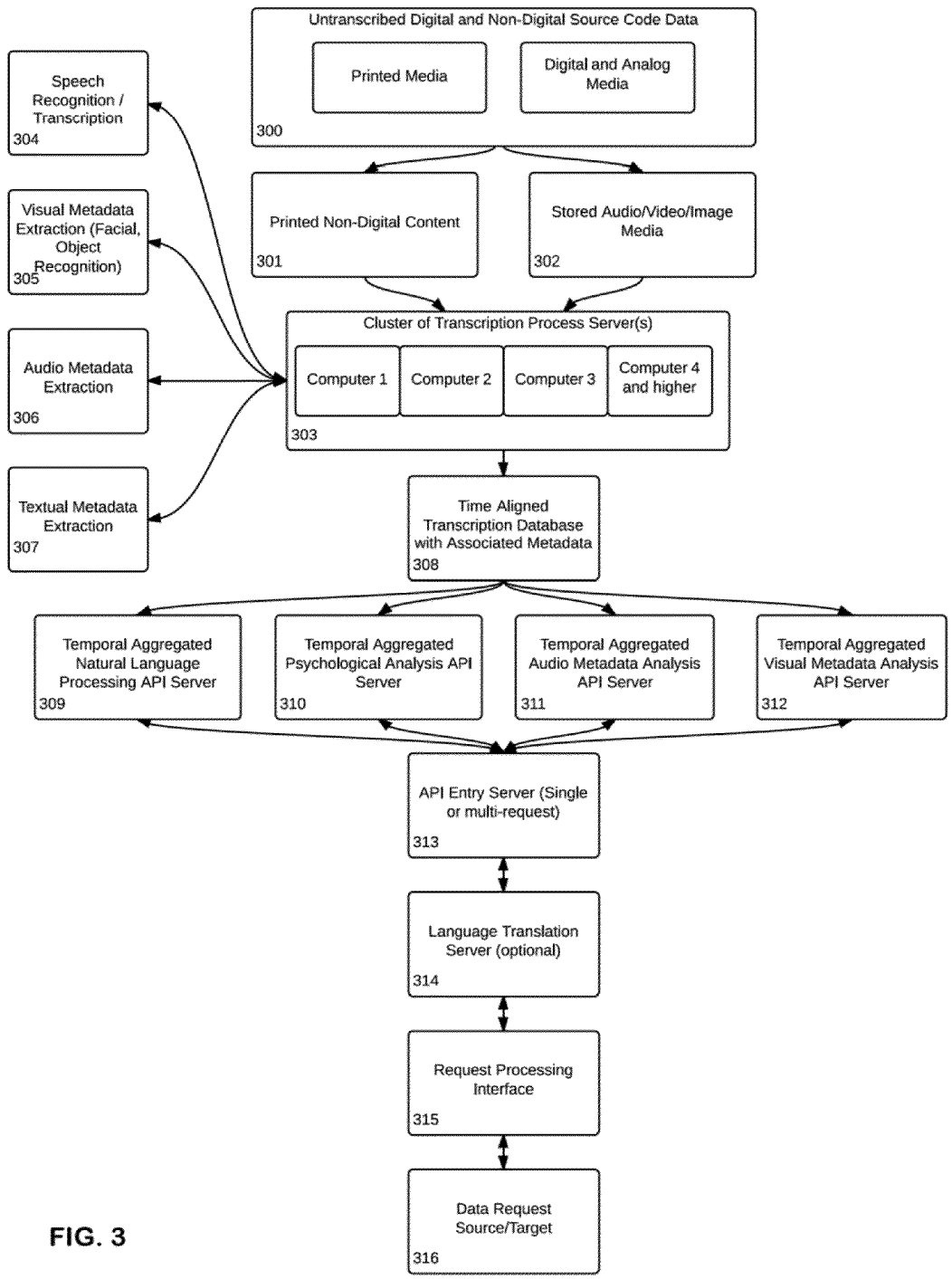
FIG. 3 is a flowchart of an exemplary process for transcribing and analyzing non-transcribed video/audio stream in accordance with an exemplary embodiment of the claimed invention.

Turning now to FIG. 3, there is illustrated a flow chart describing the process of converting, extracting metadata and analyzing the untranscribed data in real-time or post-processing in accordance with an exemplary embodiment of the claimed invention. Untranscribed digital and/or non-digital source data, such as printed and analog media streams, are received by the server 100 and stored in the database 130 at step 300. These streams can represent digitized/undigitized archived audio, digitized/undigitized archived video, digitized/undigitized archived images or other audio/video formats. The server processor 110 distinguishes or sorts the type of media received into at least printed non-digital content at step 301 and audio/video/image media at step 302. The server processor 110 routes the sorted media to the appropriate module/component for processing and normalization.

A single or cluster of servers or transcription servers 100 processes the media input and extracts relevant metadata at step 303. Data (or metadata) is extracted by streaming digital audio or video content into a server processor 110 running codecs which can read the data streams. In accordance with an exemplary embodiment of the claimed invention, the server processor 110 applies various processes to extract the relevant metadata.

Figure 4:
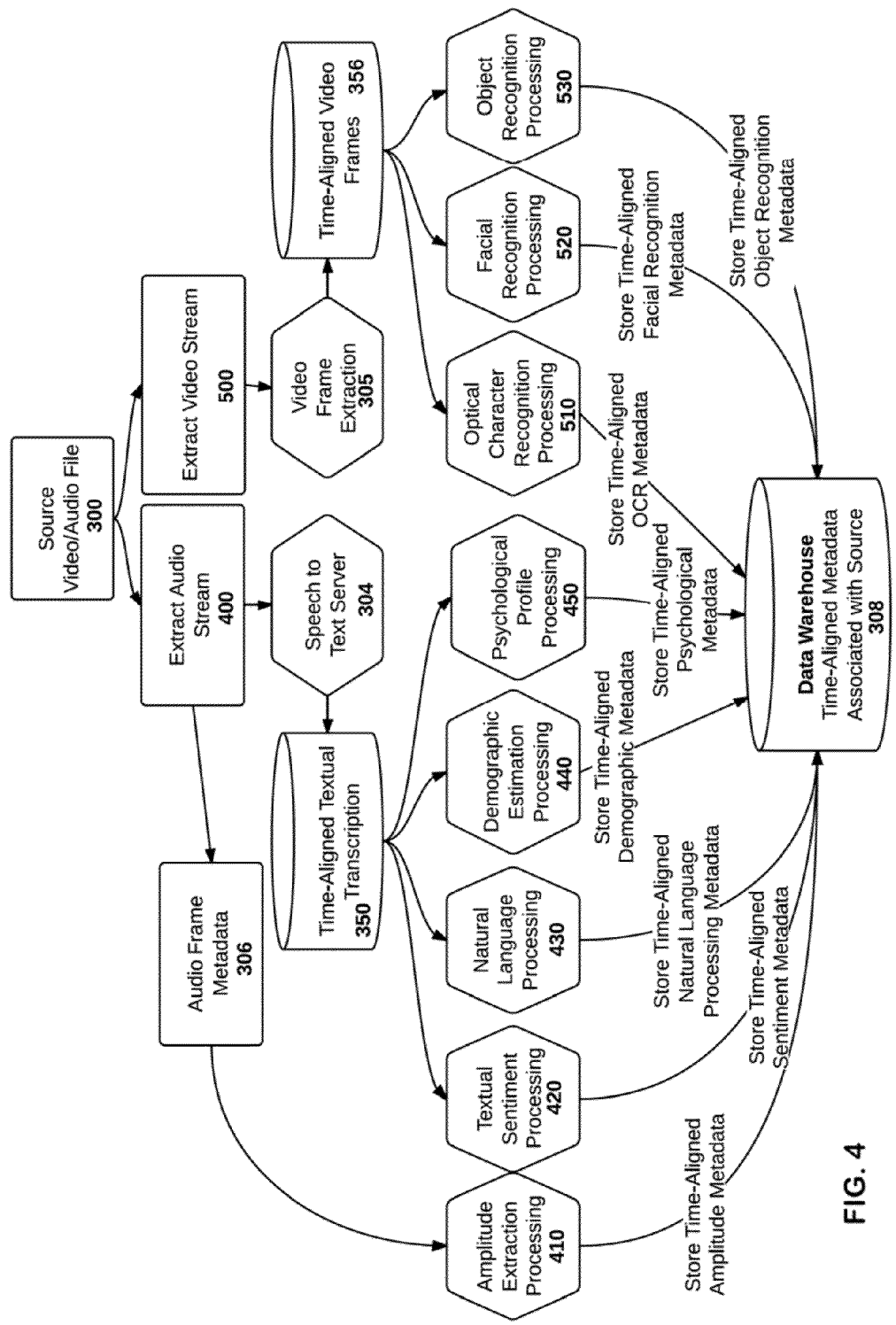
FIG. 4 is a flowchart of an exemplary process for real-time or post processed server analysis and metadata extraction of machine transcribed media in accordance with an exemplary embodiment of the claimed invention.

Turning now to FIG. 4, there is illustrated a real-time or post-processed server analysis and metadata extraction machine transcribed media. The server processor 110 extracts audio stream from the source video/audio file at step 400. The speech recognition engine 150 executes or applies speech to text conversion processes, e.g., speech recognition process, on the audio and/or video streams to transcribe the audio/video stream into textual data, preferably time-aligned textual data or transcription at step 304. The time-aligned textual transcription and metadata are stored in a database 130 or hard files at step 308. Preferably, each word in the transcription is given a start/stop timestamp to help locate the word via server based search interfaces.

Figure 5:
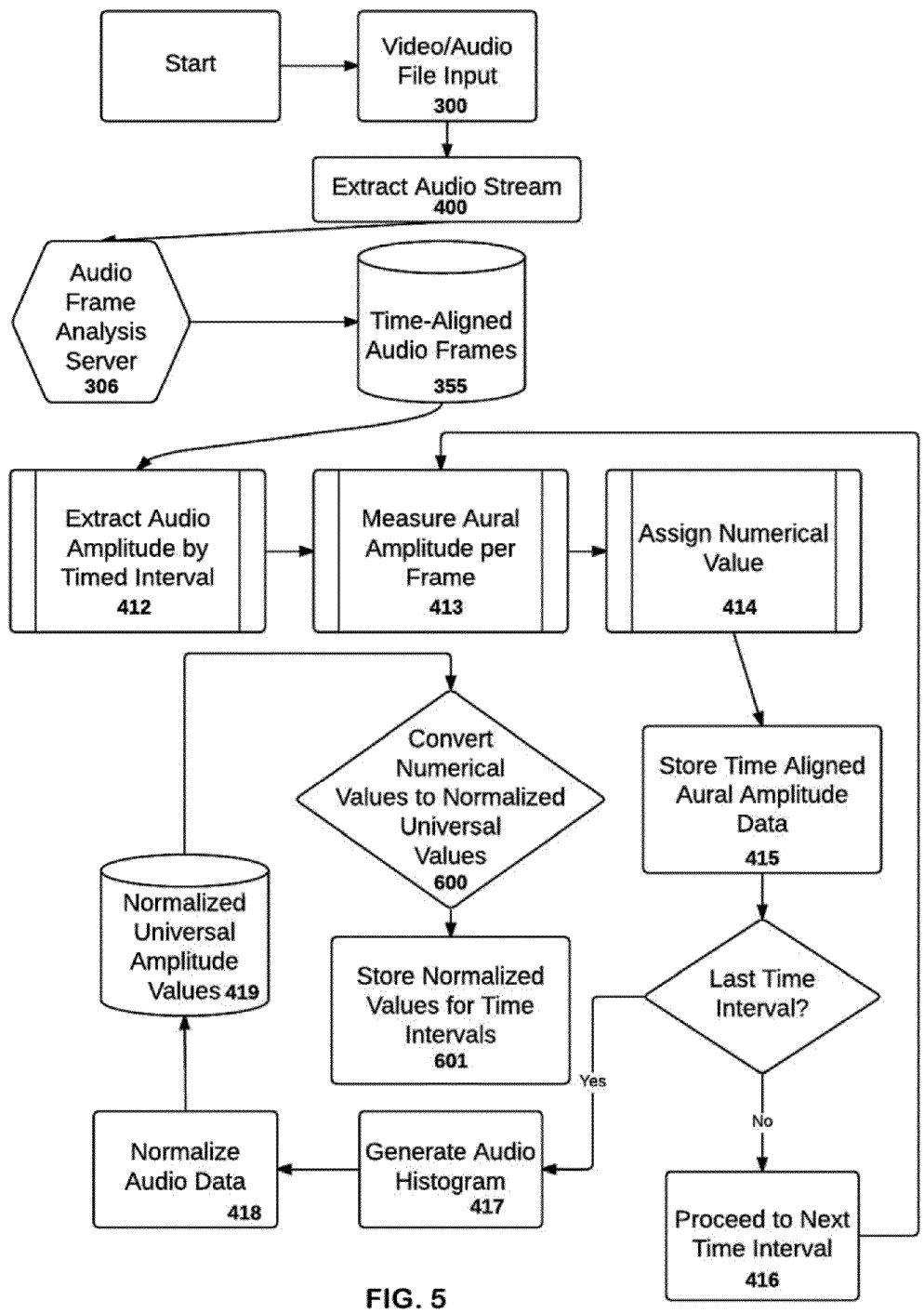
FIG. 5 is a flow chart of an exemplary process for real-time or post processed audio amplitude analysis of machine transcribed media in accordance with an exemplary embodiment of the claimed invention.

In accordance with an exemplary embodiment of the claimed invention, the server processor 110 performs real-time or post processed audio amplitude analysis of machine transcribed media comprising an audio stream and/or a video stream, preferably time-aligned audio frames and/or time-aligned video frames. The server processor 110 extracts audio frame metadata from the extracted audio stream at step 306 and executes an amplitude extraction processing on the extracted audio frame metadata at step 410. The audio frame engine 170 extracts the audio stream from the source video/audio file at step 400. The audio frame engine 160 executes or applies audio frame extraction on the audio streams to transcribe the audio stream into time-aligned audio frames at step 306. The time-aligned audio frames are stored in a database 130 or hard files at step 355. The audio metadata extraction processing is further described in conjunction with FIG. 5 illustrating a real-time or post processed audio amplitude analysis of machine transcribed media in accordance with an exemplary embodiment of the claimed invention. The server processor 110 stores the extracted audio frame metadata, preferably time-aligned audio metadata associated the source media, in the database 130 at step 355. The server processor 110 extracts audio amplitude by a timed interval from the stored time-aligned audio frames at step 412 and measures an aural amplitude of the extracted audio amplitude at step 413. The server processor 110 then assigns a numerical value to the extracted amplitude at step 414. If the server processor 110 successfully extracts and processes the audio amplitude, then the server processor 110 stores the time aligned aural amplitude metadata in the database 130 at step 415 and proceeds to the next timed interval of the time-aligned audio frames for processing. If the server processor 110 is unable to successfully extract and process the audio amplitude for a given extracted time-aligned audio frame, then server processor 110 rejects the current timed interval of timed-aligned audio frames and proceeds to the next timed interval of the time-aligned audio frames for processing.

After processing the last time interval of the stored time-aligned audio frames, the server processor 110 generates audio histogram of the audio file/data of the untranscribed digital and/or non-digital source data at step 417. In accordance with an exemplary embodiment of the claimed invention, the server processor 110 normalizes the entire audio file by determining the loudest and softest sounds within the audio file by frame, by predetermined time (e.g., second) or by other temporal approach at step 418. The server processor 110 assigns a normalized minimum amplitude value (e.g., a value of zero in an amplitude scale of 0-100 or an amplitude scale of 0-10) to the softest frame (the frame with the softest sound) and a normalized maximum amplitude value (e.g., a value of 100 in an amplitude scale of 0-100 or a value of 10 in an amplitude scale of 0-10) to the loudest frame (the frame with the loudest sound) at step 418. The server processor compares each frame of the audio file to the loudest and softest frames in the audio file by utilizing the audio histogram and assigns a relative value there between. That is, the logarithmic dB values of each frame are normalized/transformed into values within a single universal amplitude scale, thereby enabling user to perform a universal search based on the sound level. The relative value of the each frame of the audio file is stored in the database 130 at step 419. Preferably, the server processor 110 assigns a normalized amplitude value between the normalized minimum amplitude value and the normalized maximum amplitude value (e.g., an amplitude value of 1-99 from an amplitude scale of 0-100) to each frame in accordance with a result of the comparison at step 600. It is appreciated that the amplitude scale can be a numerical scale or an alphanumerical scale. The normalized amplitude value assigned to each frame of the audio file is stored in the database 130 at step 601. That is, the server processor 110 maps the numerical value of the respective frame to a single, normalized, universal amplitude scale (e.g., an amplitude scale of 0-100) at step 600, thereby enabling the user to search across all files with a standard database query. That is, the server processor 120 assigns the same value to the frame with the loudest sound in a undersampled (overly quiet) audio file and to frame with the loudest sound in an oversampled (overly loud) audio file. In accordance with an exemplary embodiment of the claimed invention, as additional audio files are processed, the server processor 110 normalizes all of the processed audio files into a single universal amplitude scale. This makes all of the time-aligned metadata to queryable or searchable using a standard database query. That is, all of the time-aligned metadata can be search/associated against all other metadata.

Since sound levels from different media sources may differ even for the same event, the media files are transformed or normalized to a common standard or a single universal amplitude scale, That is, each audio frame of the audio file is mapped to a single universal amplitude scale, thereby rendering all metadata queryable or searchable using a standard database query. In accordance with an exemplary embodiment of the claimed invention, the server processor 110 maps each frame of the media file to the normalized amplitude scale based on Euclidian distance between the logarithmic dB value of the frame and the logarithmic dB values associated with each amplitude value of the normalized amplitude scale. The server processor 110 assigns each frame of the media file the amplitude value on the normalized amplitude scale yielding the lowest Euclidian distance, thereby establishing a normalized amplitude value for each frame of a plurality of media files. This advantageously enables the claimed system to normalize, codify and search the media files for metadata based on a sound level.

Following the consumption of normalized amplitude level of the frames of the media files, the server processor 110 performs a number of metadata extraction and processing, as shown in FIGS. 3, 4 and 6-12, which are more fully described herein. The server processor 110 performs textual sentiment processing 420, natural language processing 430, demographic estimation processing 440, psychological profile processing 450, optical character recognition processing 510, facial recognition processing 520 and object recognition processing 530.

Turning to FIG. 3, in accordance with an exemplary embodiment of the claimed invention, the server processor 110 executes the textual metadata extraction process on the transcribed data or transcript of the extracted audio stream, preferably time-aligned textual transcription, to analyze and extract metadata relating to textual sentiment, natural language processing, demographics estimation and psychological profile at step 307. The extracted metadata, preferably time-aligned metadata associated with source video/audio files are stored in the database or data warehouse 130. For example, the server processor 110 analyzes or compares either the entire transcript or a segmented transcript to a predefined sentiment weighted text for a match. When a match is found, the server processor 110 stores the time-aligned metadata associated with the source media in the database 130. The server processor 110 can execute one or more application program interface (API) servers to search the stored time-aligned metadata in the data warehouse 130 in response to user search query or data request.

Figure 6:
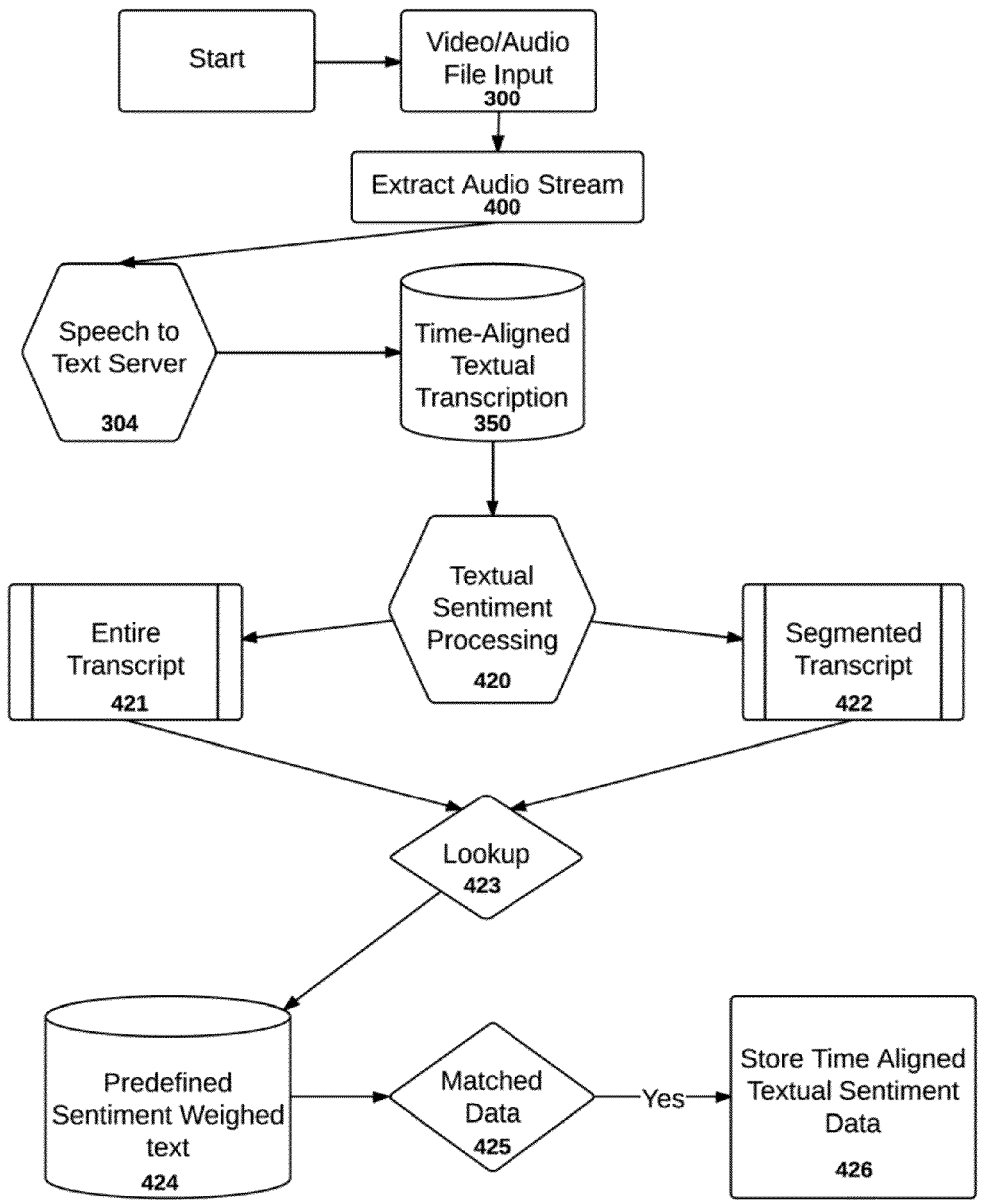
FIG. 6 is a flow chart of an exemplary process for real-time or post processed sentiment server analysis of machine transcribed media in accordance with an exemplary embodiment of the claimed invention.

In accordance with an exemplary embodiment of the claimed invention, as shown in FIG. 4, the server processor 110 performs real-time or post processed sentiment analysis of machine transcribed media at step 307. The server processor 110 performs a textual sentiment processing or analysis on the stored time-aligned textual transcription to extract sentiment metadata, preferably time-aligned sentiment metadata, at step 420. The textual sentiment processing is further described in conjunction with FIG. 6 illustrating a real-time or post processed sentiment server analysis of machine transcribed media in accordance with an exemplary embodiment of the claimed invention. The server processor 110 analyzes the entire transcript for sentiment related metadata at step 421, preferably the entire transcript is selected for analysis based on the user search query or data request. Alternatively, the server processor 110 analyzes a segmented transcript for sentiment related metadata at step 422, preferably the segmented transcript is selected for analysis based on the user search query or data request. The server processor 110 performs database lookups based on the predefined sentiment weighed text stored in the sentiment database 424 at step 423. It is appreciated that the predefined sentiment weighed text can be alternatively or additionally stored in the data warehouse 130, and the database lookups can be performed against the data warehouse 130 or against a separate sentiment database 424. The sentiment database 424 or data warehouse 130 returns the matched sentiment metadata, preferably time-aligned sentiment metadata, to the server processor 110 if a match is found at step 425. The server processor 110 stores the time-aligned textual sentiment metadata in the data warehouse 130 at step 426.

For example, the server processor 110 processes a particular sentence in the transcribed text, such as "The dog attacked the owner viciously, while appearing happy". In accordance with an exemplary embodiment of the claimed invention, the server processor 110 extract each word of the sentence via a programmatic function, and removes "stop words". Stop words can be common words, which typically evoke no emotion or meaning, e.g., "and", "or", "in", "this", etc. The server processor 110 then identifies adjectives, adverbs and verbs in the queried sentence. Using the database 130, 424 containing numerical positive/negative values for each word containing emotion/sentiment, the server processor 110 applies an algorithm to determine the overall sentiment of the processed text. In this exemplary case, the server processor 110 assigns the following numerical values to various words in the queried sentence: the word "attacked" is assigned or weighed a value between 3-4 on a 1-5 negative scale, the word "viciously" is assigned a value between 4-5 on a 1-5 negative scale, the word "happy" is assigned a value between 2-3 on a 1-5 positive scale. The server processor 110 determines an weighted average score of the queried sentence from each individual value assigned to the various words of the queried sentence.

Figure 7:
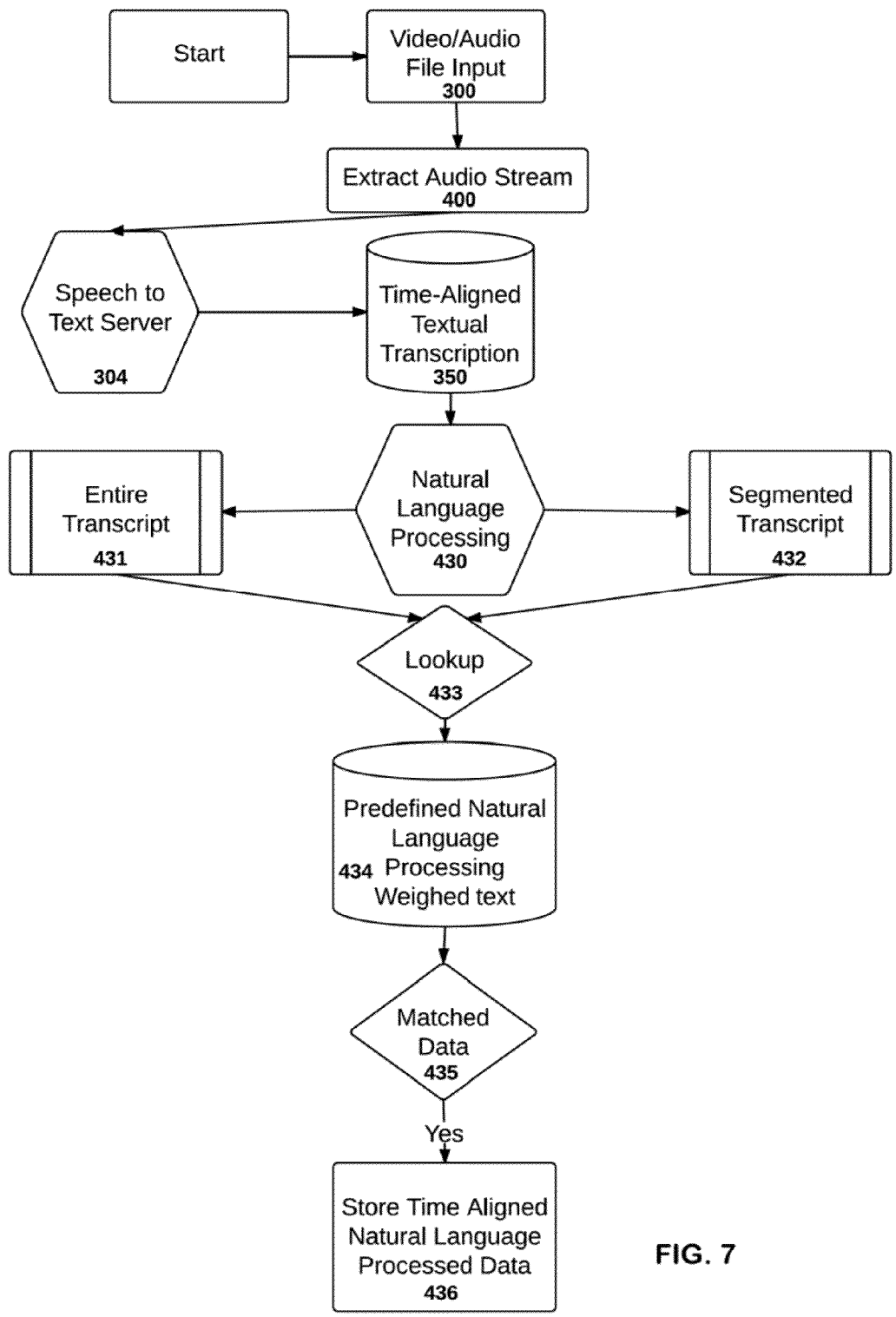
FIG. 7 is a flow chart of an exemplary process for real-time or post processed natural language processing analysis of machine transcribed media in accordance with an exemplary embodiment of the claimed invention.

In accordance with an exemplary embodiment of the claimed invention, as shown in FIG. 4, the server processor 110 performs real-time or post processed natural language analysis of machine transcribed media at step 307. The server processor 110 performs a natural language processing or analysis on the stored time-aligned textual transcription to extract natural language processed metadata related to entity, topic, key themes, subjects, individuals, people, places, things and the like at step 430. Preferably, the server processor 110 extracts time-aligned natural language processed metadata. The natural language processing is further described in conjunction with FIG. 7 illustrating a real-time or post processed natural language processing analysis of machine transcribed media in accordance with an exemplary embodiment of the claimed invention. The server processor 110 analyzes the entire transcript for natural language processed metadata at step 431, preferably the entire transcript is selected for analysis based on the user search query or data request. Alternatively, the server processor 110 analyzes a segmented transcript for the natural language processed metadata at step 432, preferably the segmented transcript is selected for analysis based on the user search query or data request. The server processor 110 performs database lookups based on the predefined natural language weighed text stored in the natural language database 434 at step 433. It is appreciated that the predefined natural language weighed text can be alternatively or additionally stored in the data warehouse 130, and the database lookups can be performed against the data warehouse 130 or against a separate natural language database 434. The natural language database 434 or data warehouse 130 returns the matched natural language processed metadata, preferably time-aligned natural language processed metadata, to the server processor 110 if a match is found at step 435. The server processor 110 stores the time-aligned natural language processed metadata in the data warehouse 130 at step 436.

In accordance with an exemplary embodiment of the claimed invention, the server processor 110 queries the transcribed text, preferably by each extracted sentence, against the database warehouse 130 and/or natural language database 434 via an API or other suitable interface to determine the entity and/or topic information. That is, the server processor 110 analyzes each sentence or each paragraph of the transcribed text and extracts known entities and topics based on the language analysis. In accordance with an exemplary embodiment of the claimed invention, the server processor 110 compares the words and phrases in the transcribed text against the database 130, 434 containing words categorized by entity and topics. An example of an entity can be an individual, person, place or thing (noun). An example of a topic can be politics, religion or other more specific genres of discussion.

Figure 8:
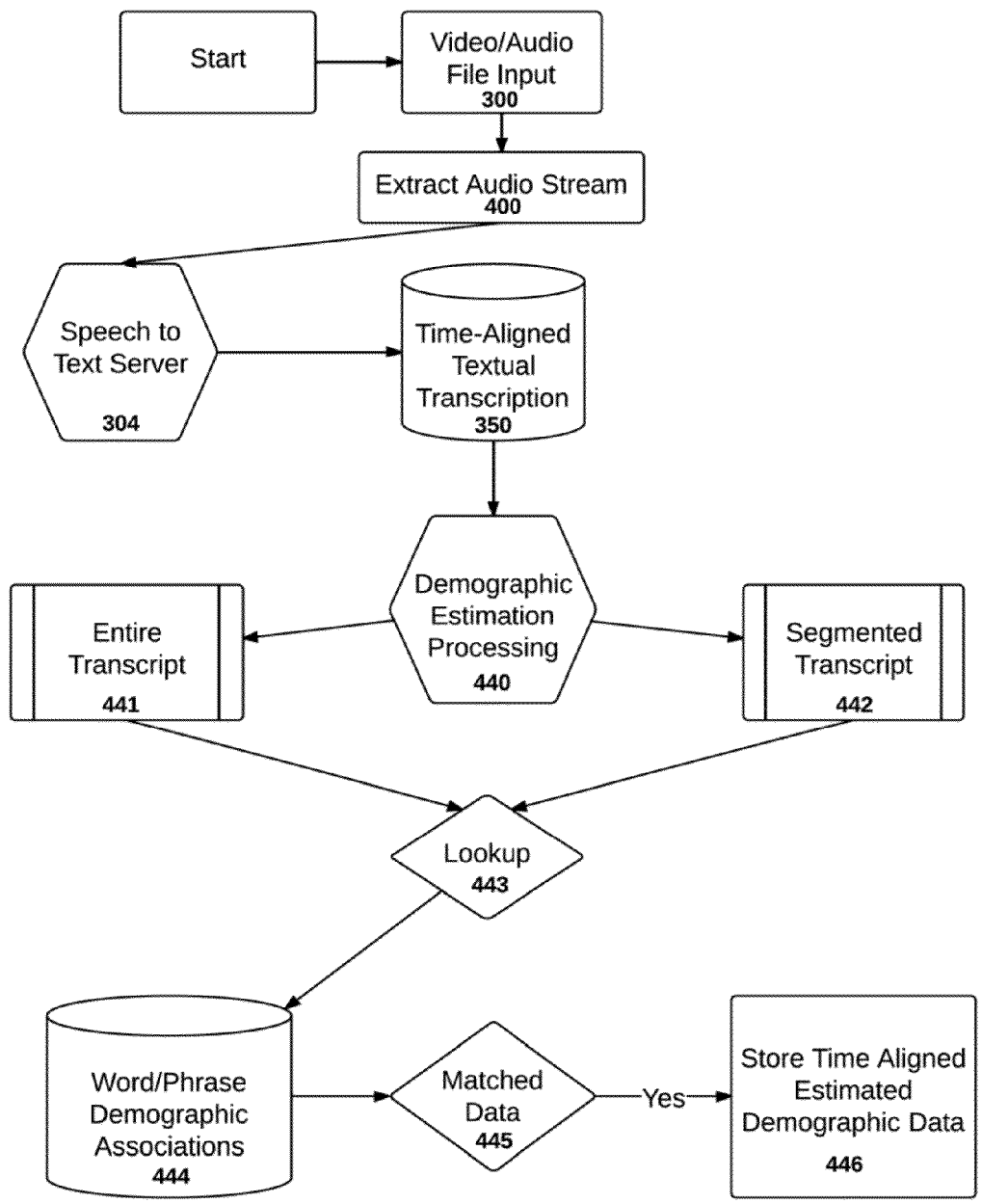
FIG. 8 is a flow chart of an exemplary process for real-time or post processed demographic estimation analysis of machine transcribed media in accordance with an exemplary embodiment of the claimed invention.

In accordance with an exemplary embodiment of the claimed invention, as shown in FIG. 4, the server processor 110 performs real-time or post processed demographic estimation server analysis of machine transcribed media at step 307. The server processor 110 performs a demographic estimation processing or analysis on the stored time-aligned textual transcription to extract demographic metadata, preferably time-aligned demographic metadata, at step 440. The demographic estimation processing is further described in conjunction with FIG. 8 illustrating a real-time or post processed demographic estimation server analysis of machine transcribed media in accordance with an exemplary embodiment of the claimed invention. The server processor 110 analyzes the entire transcript for demographic metadata at step 441, preferably the entire transcript is selected for analysis based on the user search query or data request. Alternatively, the server processor 110 analyzes a segmented transcript for the demographic metadata at step 442, preferably the segmented transcript is selected for analysis based on the user search query or data request. The server processor 110 performs database lookups based on the predefined word/phrase demographic associations stored in the demographic database 444 at step 443. It is appreciated that the predefined word/phrase demographic associations can be alternatively or additionally stored in the data warehouse 130, and the database lookups can be performed against the data warehouse 130 or against a separate demographic database 444. The demographic database 444 or data warehouse 130 returns the matched demographic metadata, preferably time-aligned demographic metadata, to the server processor 110 if a match is found at step 445. The server processor 110 stores the time-aligned demographic metadata in the data warehouse 130 at step 446.

In accordance with an exemplary embodiment of the claimed invention, the server processor 110 queries the source of the transcribed data (e.g. a specific television show) against the database warehouse 130 and/or demographic database 444 via an API or other suitable interface to determine the demographic and/or socio-demographic information. The database 130, 444 contains ratings information of the source audio/video media from which the server processor 110 extracted the transcription. Examples of such sources are a broadcast television, an internet video and/or audio, broadcast radio and the like.

In accordance with an exemplary embodiment of the claimed invention, the server 100 employs a web scraping service to extract open source, freely available information from a wide taxonomy of web-based texts. These texts, when available via open-source means are stored within the database 130, 444 and classified by their category (e.g., finance, sports/leisure, travel, and the like). For example, the server processor 110 can classified these texts into twenty categories. Using open source tools and public information, the server processor 110 extracts common demographics for these categories. When a blob of text is inputted into the system (or received by the server 100), the server processor 110 weighs the totality of the words to determine which taxonomy of text most accurately reflects the text being analyzed within the system. For example, "In 1932, Babe Ruth hits 3 home runs in Yankee Stadium" will likely have a 99% instance of being in the sports/baseball taxonomy or being categorized into the sports/leisure category by the server processor 110. Thereafter, the server processor 110 determines the age range percentages, gender percentages based upon stored demographical data in the demographic database 444 and/or the data warehouse 130.

Figure 9:
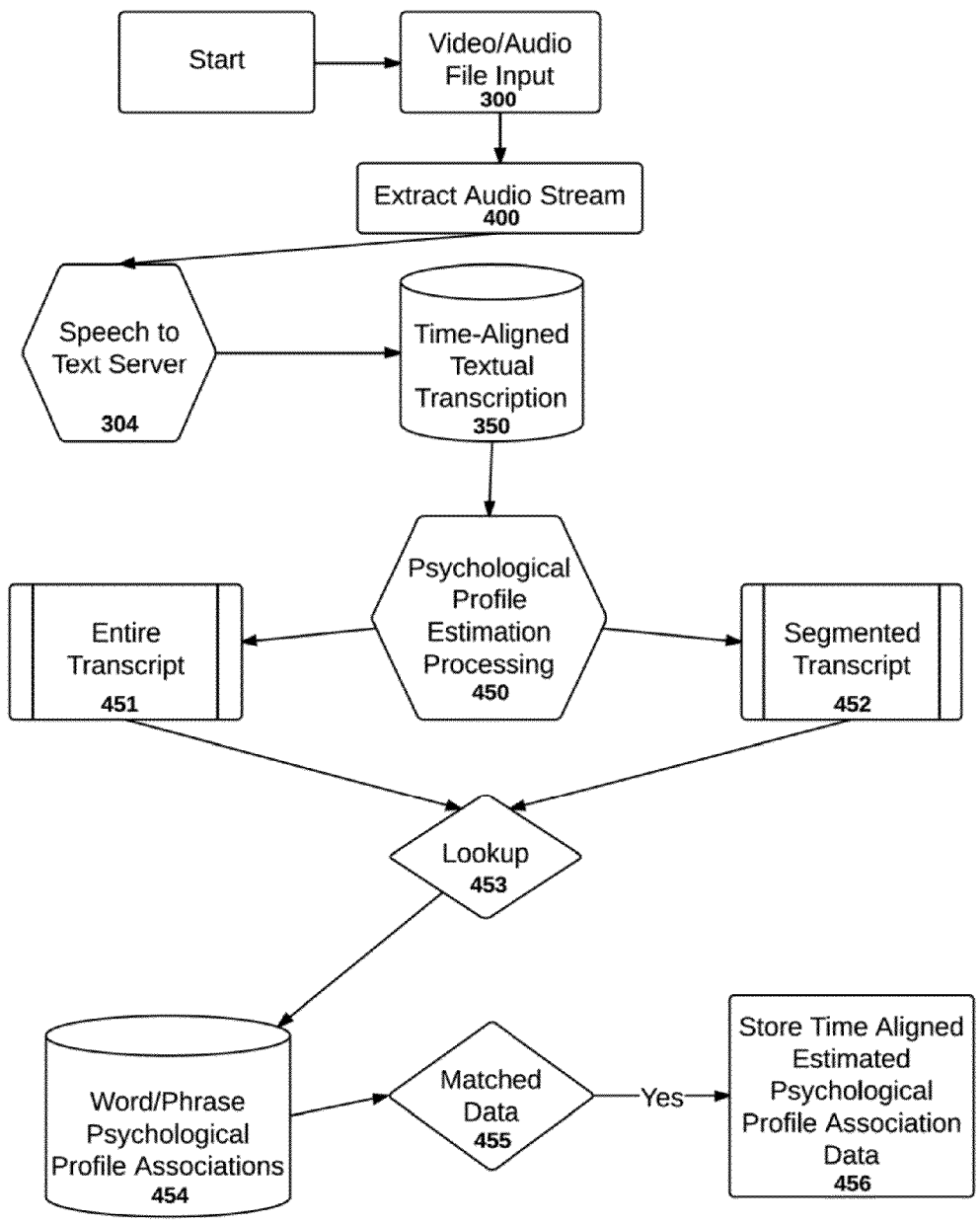
FIG. 9 is a flow chart of an exemplary process for real-time or post processed psychological profile estimation server analysis of machine transcribed media in accordance with an exemplary embodiment of the claimed invention.

In accordance with an exemplary embodiment of the claimed invention, as shown in FIG. 4, the server processor 110 performs real-time or post processed psychological profile estimation server analysis of machine transcribed media at step 307. The server processor 110 performs a psychological profile processing or analysis on the stored time-aligned textual transcription to extract psychological metadata, preferably time-aligned psychological metadata, at step 450. The psychological profile processing is further described in conjunction with FIG. 9 illustrating a real-time or post processed psychological profile estimation server analysis of machine transcribed media in accordance with an exemplary embodiment of the claimed invention. The server processor 110 analyzes the entire transcript for psychological metadata at step 451, preferably the entire transcript is selected for analysis based on the user search query or data request. Alternatively, the server processor 110 analyzes a segmented transcript for the psychological metadata at step 452, preferably the segmented transcript is selected for analysis based on the user search query or data request. The server processor 110 performs database lookups based on the predefined word/phrase psychological profile associations stored in the psychological database 454 at step 453. It is appreciated that the predefined word/phrase psychological profile associations can be alternatively or additionally stored in the data warehouse 130, and the database lookups can be performed against the data warehouse 130 or against a separate psychological database 454. The psychological database 454 or data warehouse 130 returns the matched psychological metadata, preferably time-aligned psychological metadata, to the server processor 110 if a match is found at step 455. The server processor 110 stores the time-aligned psychological metadata in the data warehouse 130 at step 456.

In accordance with an exemplary embodiment of the claimed invention, the server processor 110 processes each sentence of the transcribed text. The server processor extracts each word from a given sentence and removes the stop words, as previously described herein with respect to the sentiment metadata. The server processor 110 applies an algorithm to each extracted words and associates each extracted word back to the database 130, 454 containing values of "thinking" or "feeling" for that specific word. That is, in accordance with an exemplary embodiment of the claimed invention, the server processor 110 categorizes each extracted word into one of three categories: 1) thinking; 2) feeling; and 3) not relevant, e.g., stop words. It is appreciated that the claimed invention is not limited to sorting the words into these three categories, more than three categories can be utilized. Use of these two specific word categories (thinking and feeling) is a non-limiting example to provide a simplified explanation of the claimed psychological profile estimation processing. A word associated with logic, principles and rules falls within the "thinking" category, and the server processor 110 extracts and sums an appropriate weighted 1-5 numerical value for that "thinking" word. The same method is performed for words in the "feeling" category. Words associated or related to values, beliefs and feelings fall within the "feeling" category, and are similarly assigned an appropriate weighted 1-5 numerical value. The server processor 110 sums these weighted values in each respective category and determines a weighted average value for each sentence, a segmented transcript or entire transcript. It is appreciated that the server processor 110 uses similar approach for a variety of psychological profile types, extroverted or introverted, sensing/intuitive, perceiving/judging and other.

Turning to FIG. 3, in accordance with an exemplary embodiment of the claimed invention, the server processor 110 executes the visual metadata extraction process on the transcribed data or transcript of the extracted video stream, preferably time-aligned video frames, to analyze and extract metadata relating to optical character recognition, facial recognition and object recognition at step 305. The extracted metadata, preferably time-aligned metadata associated with the source video files are stored in the database or data warehouse 130. The video frame engine 160 extracts video stream from the source video/audio file at step 500. The video frame engine 160 executes or applies video frame extraction on the video streams to transcribe the video stream into time-aligned video frames at step 305. The time-aligned video frames are stored in a database 130 or hard files at step 308.

Turning to FIG. 4, the server processor 110 extracts video frame metadata from the extracted video stream and executes the visual metadata extraction process on the extracted time-aligned video frames at step 305. The server processor 110 can execute one or more application program interface (API) servers to search the stored time-aligned metadata in the data warehouse 130 in response to user search query or data request.

Figure 10:
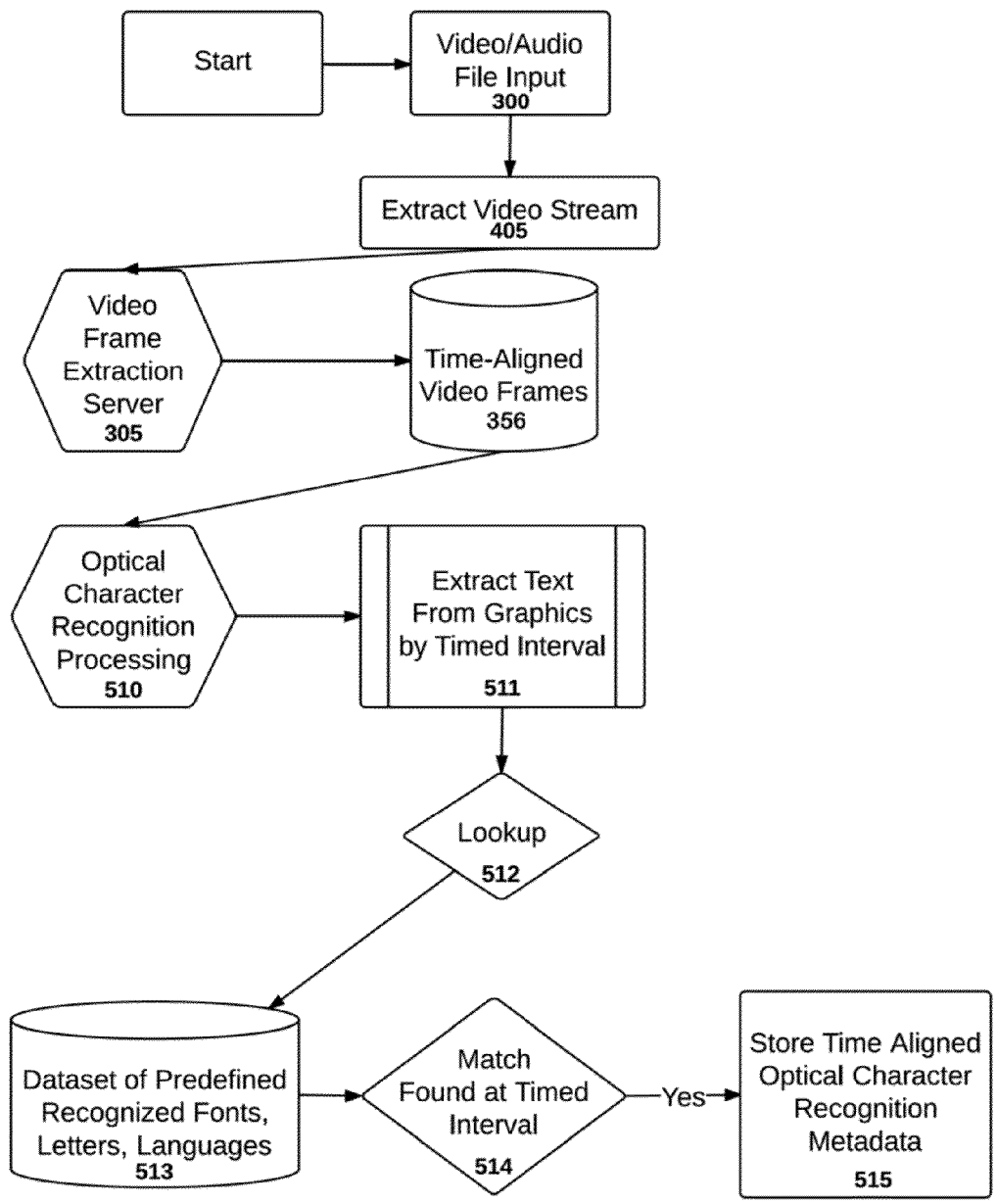
FIG. 10 is a flow chart of an exemplary process for real-time or post processed optical character recognition server analysis of machine transcribed media in accordance with an exemplary embodiment of the claimed invention.

In accordance with an exemplary embodiment of the claimed invention, as shown in FIG. 4, the server processor 110 performs real-time or post processed optical character recognition server analysis of machine transcribed media at step 305. The server processor 110 performs an optical character recognition (OCR) processing or analysis on the stored time-aligned video frames to extract OCR metadata, preferably time-aligned OCR metadata, at step 510. The OCR metadata extraction processing is further described in conjunction with FIG. 10 illustrating a real-time or post processed optical character recognition server analysis of machine transcribed media in accordance with an exemplary embodiment of the claimed invention. The video frame engine 160 stores the extracted video frame metadata, preferably time-aligned video frames associated the source media, in the database 130 at step 356. The server processor 110 extracts text from graphics by timed interval from the stored time-aligned video frames at step 511. The server processor 110 performs database lookups based on a dataset of predefined recognized fonts, letters, languages and the like stored in the OCR database 513 at step 512. It is appreciated that the dataset of predefined recognized fonts, letters, languages and the like can be alternatively or additionally stored in the data warehouse 130, and the database lookups can be performed against the data warehouse 130 or against a separate OCR database 513. The OCR database 513 or data warehouse 130 returns the matched OCR metadata, preferably time-aligned OCR metadata, to the server processor 110 if a match at the timed interval is found at step 514. The server processor 110 stores the time-aligned OCR metadata in the data warehouse 130 at step 515 and proceeds to the next timed interval of the time-aligned video frames for processing. If the server processor 110 is unable to find a match for a given timed interval of the time-aligned video frame, then server processor 110 skips the current timed interval of timed-aligned video frames and proceeds to the next timed interval of the time-aligned video frames for processing.

Figure 11:
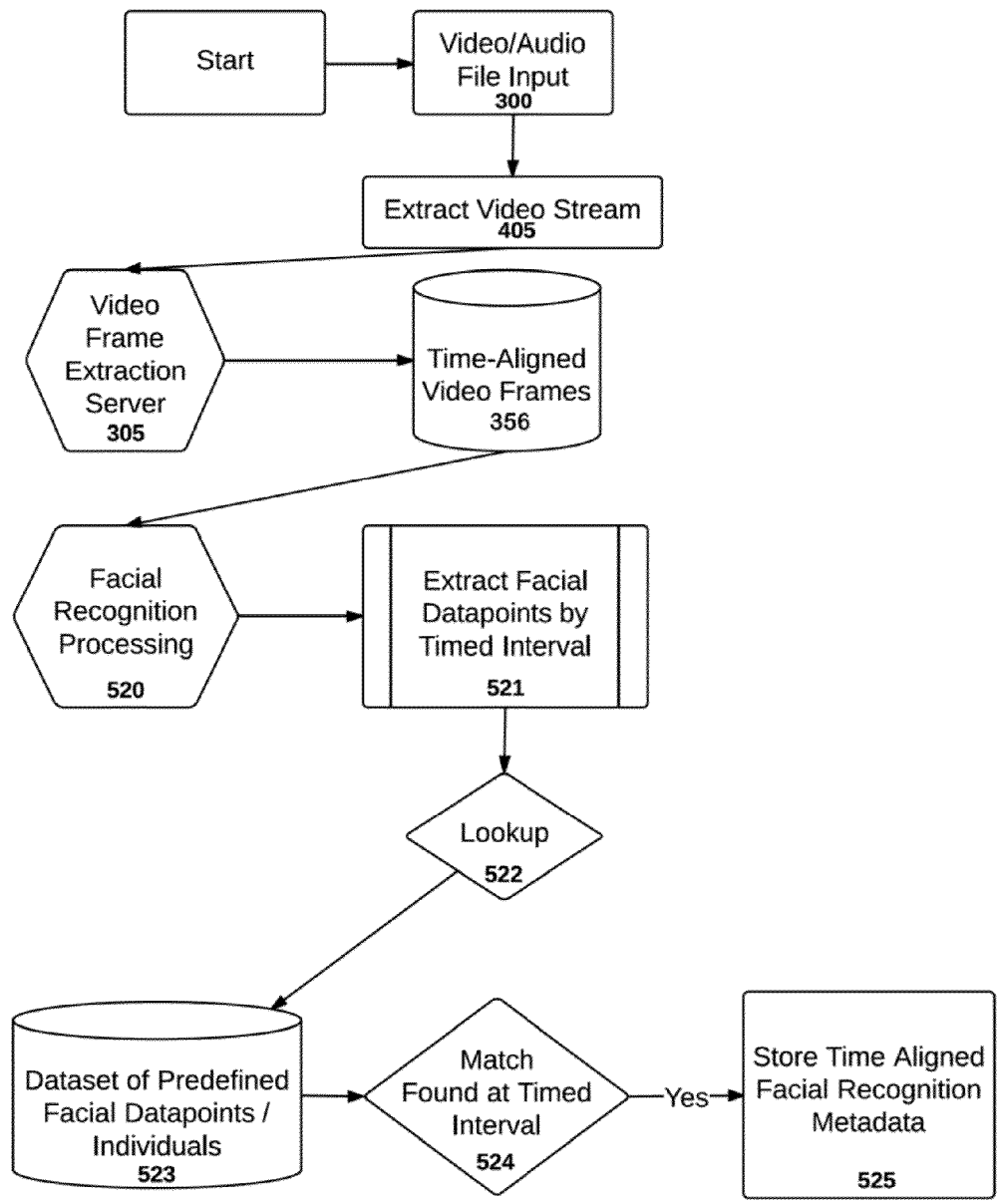
FIG. 11 is a flow chart of an exemplary process for real-time or post processed facial recognition analysis of machine transcribed media in accordance with an exemplary embodiment of the claimed invention.

In accordance with an exemplary embodiment of the claimed invention, as shown in FIG. 4, the server processor 110 performs real-time or post processed facial recognition analysis of machine transcribed media at step 305. The server processor 110 performs a facial recognition processing or analysis on the stored time-aligned video frames to extract facial recognition metadata, preferably time-aligned facial recognition metadata, at step 520. The facial recognition metadata comprises but is not limited to emotional, gender and the like. The facial recognition metadata extraction processing is further described in conjunction with FIG. 11 illustrating a real-time or post processed facial recognition analysis of machine transcribed media in accordance with an exemplary embodiment of the claimed invention. The video frame engine 160 stores the extracted video frame metadata, preferably time-aligned video frames associated the source media, in the database 130 at step 356. The server processor 110 extracts facial data points by timed interval from the stored time-aligned video frames at step 521. The server processor 110 performs database lookups based on a dataset of predefined facial data points for individuals, preferably for various well-known individuals, e.g., celebrities, politicians, newsmaker, etc., stored in the facial database 523 at step 522. It is appreciated that the dataset of predefined facial data points can be alternatively or additionally stored in the data warehouse 130, and the database lookups can be performed against the data warehouse 130 or against a separate facial database 523. The facial database 523 or data warehouse 130 returns the matched facial recognition metadata, preferably time-aligned facial recognition metadata, to the server processor 110 if a match at the timed interval is found at step 524. The server processor 110 stores the time-aligned facial recognition metadata in the data warehouse 130 at step 525 and proceeds to the next timed interval of the time-aligned video frames for processing. If the server processor 110 is unable to find a match for a given timed interval of the time-aligned video frame, then server processor 110 skips the current timed interval of timed-aligned video frames and proceeds to the next timed interval of the time-aligned video frames for processing.

In accordance with an exemplary embodiment of the claimed invention, the server processor 110 or a facial recognition server extracts faces from the transcribed video/audio and matches each of the extracted faces to known individuals or entities stored in the facial database 523 and/or the data warehouse 130. The server processor 110 also extracts and associates these matched individuals back to the extracted transcribed text, preferably down to the second/millisecond, to facilitate searching by individual and transcribed text simultaneously. The system, or more specifically the server 100, maintains thousands of trained files containing the most common points on a human face. In accordance with an exemplary embodiment of the claimed invention, the server processor 110 extracts eyes, (all outer points and their angles), mouth (all outer points and their angles), nose (all outer points and their angles) and the x, y coordinates of these features from the time-aligned video frames and compares/matches the extracted features to the stored facial features (data points) of known individuals and/or entities in the facial database 523 and/or data warehouse 130. It is appreciated that the number of data points is highly dependent on the resolution of the file, limited by the number of pixels. These data points create a "fingerprint" like overlay of an individual's face, at which point it is compared with the pre-analyzed face "fingerprints" already stored in a local or external database, e.g., the server database 130, the facial database 523 and/or the client storage 250. For certain application, the client storage/database 250 may contain a limited set of pre-analyzed face fingerprints for faster processing. For a large scale search, the server processor 110 returns a list of the 10 most probable candidates. For a small scale search of a trained 1000 person database, the search accuracy of the claimed invention can reach near 100%.

Figure 12:
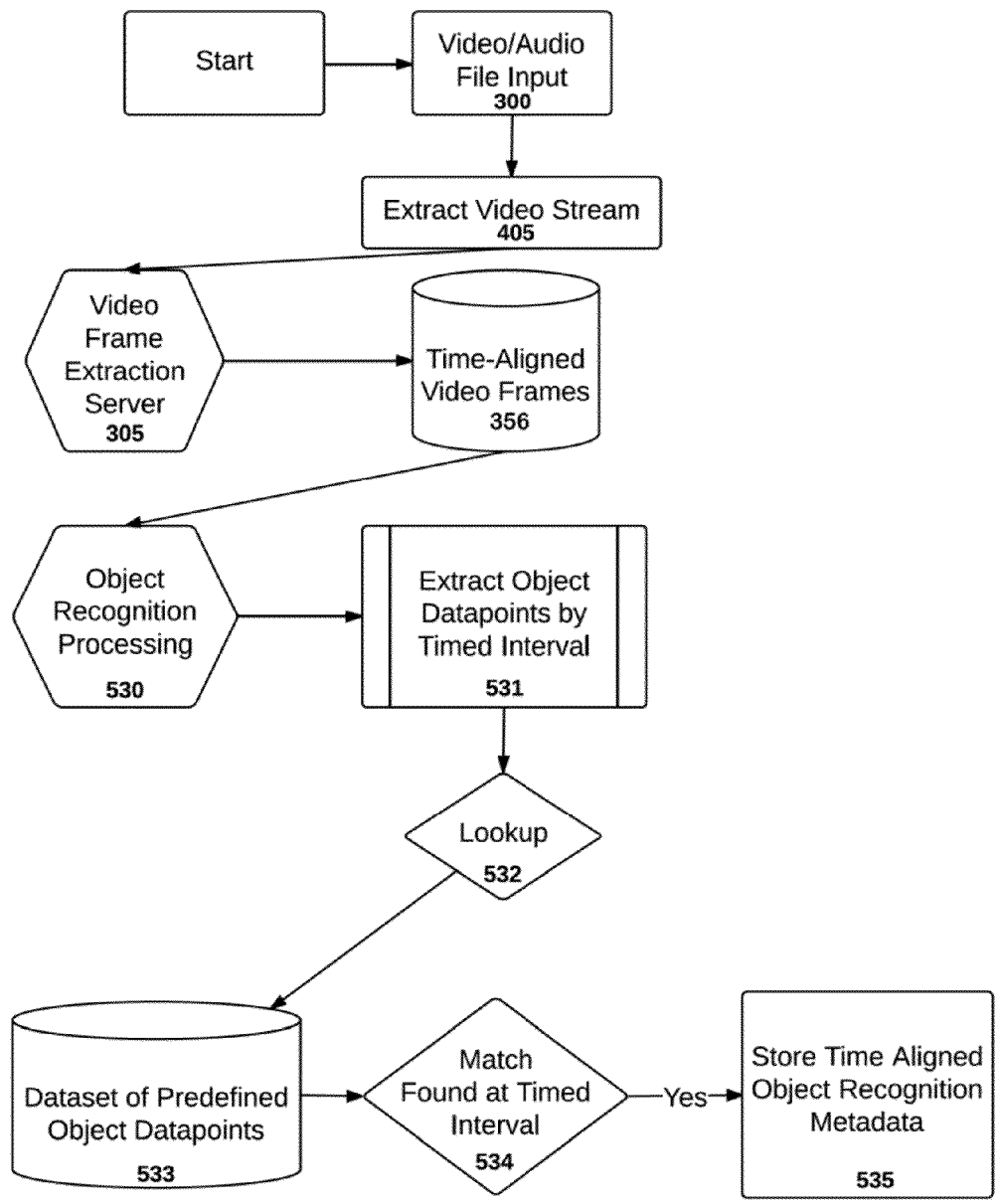
FIG. 12 is a flow chart of an exemplary process for real-time or post processed object recognition analysis of machine transcribed media in accordance with an exemplary embodiment of the claimed invention.

In accordance with an exemplary embodiment of the claimed invention, as shown in FIG. 4, the server processor 110 performs real-time or post processed object recognition analysis of machine transcribed media at step 305. The server processor 110 performs an object recognition processing or analysis on the stored time-aligned video frames to extract object recognition metadata, preferably time-aligned object recognition metadata, at step 530. The object recognition metadata extraction processing is further described in conjunction with FIG. 12 illustrating a real-time or post processed object recognition analysis of machine transcribed media in accordance with an exemplary embodiment of the claimed invention. The video frame engine 160 stores the extracted video frame metadata, preferably time-aligned video frames associated the source media, in the database 130 at step 356. The server processor 110 extracts object data points by timed interval from the stored time-aligned video frames at step 531. The server processor 110 performs database lookups based on a dataset of predefined object data points stored in the object database 533 at step 532. It is appreciated that the dataset of predefined object data points can be alternatively or additionally stored in the data warehouse 130, and the database lookups can be performed against the data warehouse 130 or against a separate object database 533. The object database 533 or data warehouse 130 returns the matched object recognition metadata, preferably time-aligned object recognition metadata, to the server processor 110 if a match at the timed interval is found at step 534. The server processor 110 stores the time-aligned object recognition metadata in the data warehouse 130 at step 535 and proceeds to the next timed interval of the time-aligned video frames for processing. If the server processor 110 is unable to find a match for a given timed interval of the time-aligned video frame, then server processor 110 skips the current timed interval of timed-aligned video frames and proceeds to the next timed interval of the time-aligned video frames for processing.

In accordance with an exemplary embodiment of the claimed invention, the server processor 110 or an object recognition server extracts objects from the transcribed video/audio and matches each of the extracted objects to known objects stored in the object database 533 and/or the data warehouse 130. The server processor 110 identifies/recognizes objects/places/things via an image recognition analysis. In accordance with an exemplary embodiment of the claimed invention, the server processor 110 compares the extracted objects/places/things against geometrical patterns stored in the object database 533 and/or the data warehouse 130. The server processor 110 also extracts and associates these matched objects/places/things back to the extracted transcribed text, preferably down to the second/millisecond, to facilitate searching by objects/places/things and transcribed text simultaneously. Examples of an object/place/thing are dress, purse, other clothing, building, statute, landmark, city, country, local, coffee mug, other common items and the like.

The server processor 110 performs object recognition in much the same way as the facial recognition. Instead of analyzing "facial" features, the server processor 110 analyzes the basic boundaries of an object. For example, the server processor 110 analyzes the outer points of the Eiffel tower's construction, analyzes a photo, pixel by pixel and compares it to a stored object "fingerprint" file to detect the object. The object "fingerprint" files are stored in the object database 533 and/or the data warehouse 130.

Once the various extraction processes has been executed on the time-aligned textual transcription, time-aligned audio frames and/or time-aligned video frames, the server processor 110 updates the data warehouse 130 with these new pieces of time-aligned metadata associated the source media.

Returning to FIG. 3, the process of which the user can utilize and search the time-aligned extracted metadata associated with the source file will now be described. As noted herein, the source file can be printed non-digital content, audio/video/image media. A user, preferably an authorized user, logs on to the serve 100 over the communications network 300. Preferably, the server 100 authenticates the user using any known verification methods, e.g., userid and password, etc., before providing access to the data warehouse 130. The client processor 210 of the client device 200 associated with the user transmits the data request or search query to the server 100 over the communications network 300 via the connection facility 260 at step 316. The server processor 110 receives the data request/search query from the user's client device 200 via the connection facility 140. It is appreciated that the originating source of the query can be an automated external server process, automated internal server process, one-time external request, one-time internal request or other comparable process/request. In accordance with an exemplary embodiment of the claimed invention, the server 100 presents a graphical user interface (GUI), such as web based GUI or pre-compiled GUI, on the display 220 of the user's client device 200 for receiving and processing the data request or search query by the user at step 315. Alternatively, the server 100 can utilize an application programming interface (API), direct query or other comparable means to receive and process data request from the user's client device 200. That is, once the search query is received from the user's client device 200, the server processor 110 converts the textual data (i.e., data request or search query) into an acceptable format for a local or remote Application Programming Interface (API) request to the data warehouse 130 containing time-aligned metadata associated with source media at step 313. The data warehouse 130 returns language analytics results of one or more of the following correlated with the normalized amplitude value: a) temporal aggregated natural language processing 309, such as sentiment, entity/topic analysis, socio-demographic or demographic information sentiment; b) temporal aggregated psychological analysis 310; c) temporal aggregated audio metadata analysis 311; and d) temporal aggregated visual metadata analysis 312. In accordance with an exemplary embodiment of the claimed invention, the server 100 can allow for programmatic, GUI or direct selective querying of the time-aligned textual transcription and metadata stored in the data warehouse 130 as result of various extraction processing and analysis on the source video/audio file. For example, this advantageously enables the claimed invention to extract metadata, e.g., textual sentiment, facial or objection recognition, for period of time proceeding or succeeding an event associated with a highest sound (e.g., a riot) across a multitude of media sources.

In accordance with an exemplary embodiment of the claimed invention, the temporal aggregated natural language processing API server provides numerical or textual representation of sentiment. That is, the sentiment is provided on a numerical scale, a positive sentiment on a numerical scale, a negative sentiment on a numerical scale and a neutral sentiment being zero (0). These results are achieved the server processor 110 using natural language processing analyses. Specifically, the server processor queries the data against positive/negative weighed words and phrases stored in a server database or data warehouse 130.

In accordance with an exemplary embodiment of the claimed invention, the server processor 110 or a server based hardware component interacts directly with the data warehouse 130 to query and analyze the stored media of time-aligned metadata for natural language processed, sentiment, demographic and/or socio-demographic information at step 309. Preferably, the system utilizes a natural language processing API server to query and analyze the stored media. It is appreciated that after analysis the source media, the server processor 110 updates the data warehouse 130 with the extracted information, such as the extracted time-aligned sentiment, natural-language processed and demographic metadata.

In accordance with an exemplary embodiment of the claimed invention, the server processor 110 or a server based hardware component interacts directly with the data warehouse 130 to query and analyze the stored media of time-aligned metadata for psychological information at step 310. Preferably, the system utilizes a psychological analysis API server to query and analyze the stored time-aligned psychological metadata. It is appreciated that after analysis the source media, the server processor 110 updates the data warehouse 130 with the extracted information, such as the extracted time-aligned psychological metadata.

In accordance with an exemplary embodiment of the claimed invention, the temporal aggregated psychological analysis API server provides numerical or textual representation of the psychological profile or model. That is, a variety of psychological indicators are returned indicating the psychological profile of individuals speaking in a segmented or entire transcribed text or transcript. The server processor 110 compares the word/phrase content appearing in the analyzed transcribed text against the stored weighed psychological data, e.g., the stored predefined word/psychological profile associations, in the psychological database 454 or the server database 130.

In accordance with an exemplary embodiment of the claimed invention, the server processor 110 or a server based hardware component interacts directly with the data warehouse 130 to query and analyze stored media of time-aligned metadata for audio information at step 311. Preferably, the system utilizes an audio metadata analysis API server to query and analyze time-aligned audio metadata, such as the time-aligned amplitude metadata. It is appreciated that after analysis the source media, the server processor 110 updates the data warehouse 130 with the extracted information, such as the extracted time-aligned amplitude metadata.

In accordance with an exemplary embodiment of the claimed invention, the server processor 110 or a server based hardware component interacts directly with the data warehouse 130 to query and analyze stored media of time-aligned metadata for visual information at step 312. Preferably, the system utilizes the visual metadata analysis API server to query and analyze time-aligned visual metadata, such as the time-aligned OCR, facial recognition and object recognition metadata. It is appreciated that after analysis the source media, the server processor 110 updates the data warehouse 130 with the extracted information, such as the extracted time-aligned OCR, facial recognition and object recognition metadata.

In accordance with an exemplary embodiment of the claimed invention, the system comprises an optional language translation API server for providing server-based machine translation of the returned data into a human spoken language selected by the user at step 314.

It is appreciated that any combination of data stored by the server processor 110 in performing the conversion, metadata extraction and analytical processing of untranscribed media can be searched. The following is a list of non-limiting exemplary searches: searching the combined transcribed data (a search via an internet appliance for "hello how are you" in a previously untranscribed audio/video stream); searching combined transcribed data for sentiment; searching combined transcribed data for psychological traits; searching combined transcribed data for entities/concepts/themes; searching the combined transcribed data for individuals (politicians, celebrities) in combination with transcribed text via facial recognition; and any combination of the above searches.

Currently, the majority of video/audio streaming services allow for search solely by title, description and genre of the file. With the claimed invention, a variety of unique search methods combining extracted structured and unstructured textual, aural and visual metadata from media files is now possible. The following is non-limiting exemplary searches after the source media files have been transcribed in accordance with the claimed invention:

search transcribed media for a specific textual phrase, only when a specific person appears within 10 seconds of inputted phrase, e.g., "Home Run," combined with facial recognition of a specific named baseball player (e.g., Derek Jeter);

search transcribed media for the term "Home Run," when uttered in a portion of the file where sentiment is negative;

search transcribed media for the term "Home Run," ordered by aural amplitude. This would allow a user to reveal the phrase he/she is searching for, during a scene with the most noise/action;

search transcribed media for the term "Home Run" when more than 5 faces are detected on screen at once. This could reveal a celebration on the field. A specific example would be the 1986 World Series, when Tim Teufel hit a walk-off home run, and 10+ players celebrated at home plate.

search transcribed media an audio only file for the phrase "Home Run" along with "New York Mets" when the content is editorial. The server processor 110 applies psychological filters, e.g., "thinking" vs. "feeling," to identify emotional/editorial content vs. academic/thinking content; and search transcribed media for a specific building, for example "Empire State Building" when the phrase "was built" was uttered in the file. This would allow for a novel search to find construction videos of the Empire State Building.

In accordance with an exemplary embodiment of the claimed invention, when the transcribed media is searched for an entity, the system not only extracts time-aligned natural language processed metadata related to the entity being search, but the time-aligned natural language processed metadata is mapped to a single, normalized, universal amplitude scale, thereby providing a normalized amplitude level at the time of utterance. That is, in the context of search and advertising, the claimed single, normalized, universal amplitude scale enables the claimed system to determine the weight of the entity being mentioned/viewed in the transcribed media.

In accordance with an exemplary embodiment of the claimed invention, the system can be also utilized to analyze transcribed media for demographic information, based upon database-stored text corpuses, broken down by taxonomy. For example, the server processor 110 analyzes the transcribed media file in its entirety, then programmatically compares the transcription to a stored corpus associated with all taxonomies. For example, the system can rank politics the highest versus all other topical taxonomies and the system can associate gender/age-range are associated with political content. This can advantageously permit the server processor 110 to utilize the time-aligned metadata for targeted advertising. The server processor 110 can apply these extracted demographics with revealed celebrities/public figures to assist in the development of micro-target advertisements during streaming audio/video.

In accordance with an exemplary embodiment of the claimed invention, a vast opportunities are available with the claimed system's ability to search transcribed video files via optical character recognition of video frames. For example, a user can search for "WalMart", and receive not only spoken words, but appearances of the WalMart logo on the screen 220 of her client device 200, extracted via optical character recognition on a still frame of the video by the server processor 110.

In accordance with an exemplary embodiment of the claimed invention, the claimed system extracts at least one or more of the following metadata and makes them queryable using standard database query: audio amplitude, textual sentiment, natural language processing, demographic estimation, psychological profile, optical character recognition, facial recognition and object recognition. The user can search any combination of the aforementioned metadata. For example, the user can search news clips of specific genre for large crowds rioting or protesting by initiating a database query with the following constraints: search only first three minutes of media with more than 50 faces detected and with an audio amplitude scale of 90+ for over ten seconds. In another example, the user can search the media files for utterance of word "stop" by initiating a database query for a word "stop" with the amplitude scale of 100. In yet another example, instead of relying on the ineffective consumer survey at the end of the service call which is skipped by vast majority of the consumer, the service provider can utilize the claimed system to determine actual customer experience with its customer representative by initiating a database query for negative textual sentiment with an audio amplitude scale of 70+ over multiple consecutive audio/video frame, e.g., 5 seconds of someone complaining loudly.

The accompanying description and drawings only illustrate several embodiments of a system, methods and interfaces for metadata identification, searching and matching, however, other forms and embodiments are possible. Accordingly, the description and drawings are not intended to be limiting in that regard. Thus, although the description above and accompanying drawings contain much specificity, the details provided should not be construed as limiting the scope of the embodiments but merely as providing illustrations of some of the presently preferred embodiments. The drawings and the description are not to be taken as restrictive on the scope of the embodiments and are understood as broad and general teachings in accordance with the present invention. While the present embodiments of the invention have been described using specific terms, such description is for present illustrative purposes only, and it is to be understood that modifications and variations to such embodiments may be practiced by those of ordinary skill in the art without departing from the spirit and scope of the invention.

The invention claimed is:

1. A computer based method for transcribing and extracting metadata from a non-transcribed source media, comprising the steps of:
    extracting an audio stream from the non-transcribed source media by a processor-based server;
    speech recognition processing of the audio stream to transcribe the audio stream into a time-aligned textual transcription by a speech recognition engine to provide a time-aligned machine transcribed media;
    extracting time-aligned audio frames from the audio stream by an audio frame engine;
    processing the time-aligned audio frames to extract audio amplitudes by a timed interval, to measure aural amplitudes of the extracted audio amplitudes and assign a numerical value to each extracted audio amplitude to provide time-aligned aural amplitudes by a server processor;
    generating an audio histogram of the audio stream by the server processor;
    normalizing the audio stream to a single, normalized, universal amplitude scale by determining a loudest frame with a loudest sound and a softest frame with a softest sound within the audio stream by the server processor;
    assigning a normalized minimum amplitude value to the softest frame of the audio stream and a normalized maximum amplitude value to the loudest frame of the audio stream;
    comparing each frame of the audio stream to the loudest frame and the softest frame by utilizing the audio histogram and assigning a normalized amplitude value between the normalized minimum amplitude value and the normalized maximum amplitude value to said each frame in accordance with a result of the comparison;

processing the time-aligned machine transcribed media by the server processor to extract time-aligned textual metadata associated with the source media; and storing the time-aligned machine transcribed media, the time-aligned audio frames, the time-aligned aural amplitudes, time-aligned textual metadata and the normalized amplitude value of each frame of the audio stream in a database.

2. The computer based method of claim 1, wherein the step of processing the time-aligned machine transcribed media further comprises the steps of:

performing a textual sentiment analysis on a full or a segment of the time-aligned textual transcription by the server processor to extract time-aligned sentiment metadata;

performing database lookups based on predefined sentiment weighed texts stored in the database; and receiving one or more matched time-aligned sentiment metadata from the database by the server processor.

3. The computer based method of claim 1, wherein the step of processing the time-aligned machine transcribed media further comprises the steps of:

performing a natural language processing on a full or a segment of the time-aligned textual transcription by the server processor to extract time-aligned natural language processed metadata related to at least one of the following: an entity, a topic, a key theme, a subject, an individual, and a place;

performing database lookups based on predefined natural language weighed texts stored in the database; and receiving one or more matched time-aligned natural language metadata from the database by the server processor.

4. The computer based method of claim 1, wherein the step of processing the time-aligned machine transcribed media further comprises the steps of:

performing a demographic estimation processing on a full or a segment of the time-aligned textual transcription by the server processor to extract time-aligned demographic metadata;

performing database lookups based on predefined word/phrase demographic associations stored in the database; and receiving one or more matched time-aligned demographic metadata from the database by the server processor.

5. The computer based method of claim 1, wherein the step of processing the time-aligned machine transcribed media further comprises the steps of:

performing a psychological profile estimation processing on a full or a segment of the time-aligned textual transcription by the server processor to extract time-aligned psychological metadata;

performing database lookups based on predefined word/phrase psychological profile associations stored in the database; and receiving one or more matched time-aligned psychological metadata from the database by the server processor.

6. The computer based method of claim 1, wherein the step of processing the time-aligned machine transcribed media further comprises the step of performing at least one of the following:

a textual sentiment analysis on the time-aligned machined transcribed media by the server processor to extract time-aligned sentiment metadata;

a natural language processing on the time-aligned machined transcribed media by the server processor to extract time-aligned natural language processed metadata related to at least one of the following: an entity, a topic, a key theme, a subject, an individual, and a place;

a demographic estimation processing on the time-aligned machined transcribed media by the server processor to extract time-aligned demographic metadata; and a psychological profile estimation processing on the time-aligned machined transcribed media by the server processor to extract time-aligned psychological metadata.

7. The computer based method of claim 1, further comprising the steps:

extracting a video stream from the source media by a video frame engine;

extracting time-aligned video frames from the video stream by the video frame engine;

storing the time-aligned video frames in the database; and processing the time-aligned video frames by the server processor to extract time-aligned visual metadata associated with the source media.

8. The computer based method of claim 1, further comprising the step of generating digital advertising based on one or more time-aligned textual metadata associated with the source media.

9. A computer based method for converting and extracting metadata from a non-transcribed source media, comprising the steps of:

extracting an audio stream from the non-transcribed source media by a speech recognition a processor-based server;

extracting a video stream from the non-transcribed source media by a video frame engine of the processor-based server;

extracting time-aligned video frames from the video stream by the video frame engine;

extracting time-aligned audio frames from the audio stream by an audio frame engine;

processing the time-aligned video frames by a server processor to extract time-aligned visual metadata associated with the source media;

processing the time-aligned audio frames to extract audio amplitudes by a timed interval, to measure aural amplitudes of the extracted audio amplitudes and assign a numerical value to each extracted audio amplitude to provide time-aligned aural amplitudes metadata;

generating an audio histogram of the audio stream by the server processor;

normalizing the audio stream to a single, normalized, universal amplitude scale by determining a loudest frame with a loudest sound and a softest frame with a softest sound within the audio stream by the server processor;

assigning a normalized minimum amplitude value to the softest frame of the audio stream and a normalized maximum amplitude value to the loudest frame of the audio stream;

comparing each frame of the audio stream to the loudest frame and the softest frame by utilizing the audio histogram and assigning a normalized amplitude value between the normalized minimum amplitude value and the normalized maximum amplitude value to said each frame in accordance with a result of the comparison; and storing the time-aligned video frames, the time-aligned audio frames, the time-aligned aural amplitudes, time-aligned visual metadata and the normalized amplitude value of each frame of the audio stream in a database.

10. The computer based method of claim 9, wherein the step of processing the time-aligned video frames further comprises the steps of:

an optical character recognition (OCR) analysis on the time-aligned video frames by the server processor to extract time-aligned OCR metadata;

extracting texts from graphics by a timed interval from the time-aligned video frames;

performing database lookups based on a dataset of predefined recognized fonts, letters and languages stored in the database; and receiving one or more matched time-aligned OCR metadata from the database by the server processor.

11. The computer based method of claim 9, wherein the step of processing the time-aligned video frames further comprises the steps of:

performing a facial recognition analysis on the time-aligned video frames by the server processor to extract time-aligned facial recognition metadata;

extracting facial data points by a timed interval from the time-aligned video frames;

performing database lookups based on a dataset of predefined facial data points for individuals stored in the database; and receiving one or more matched time-aligned facial metadata from the database by the server processor.

12. The computer based method of claim 9, wherein the step of processing the time-aligned video frames further comprises the steps of:

performing an object recognition analysis on the time-aligned video frames by the server processor to extract time-aligned object recognition metadata;

extracting object data points by a timed interval from the time-aligned video frames;

performing database lookups based on a dataset of predefined object data points for a plurality of objects stored in the database; and receiving one or more matched time-aligned object metadata from the database by the server processor.

13. The computer based method of claim 9, wherein the step of processing the time-aligned video frames further comprises the steps of:

an optical character recognition (OCR) analysis on the time-aligned video frames by the server processor to extract time-aligned OCR metadata;

performing a facial recognition analysis on the time-aligned video frames by the server processor to extract time-aligned facial recognition metadata; and performing an object recognition analysis on the time-aligned video frames by the server processor to extract time-aligned object recognition metadata.

14. A non-transitory computer readable medium comprising computer executable code for transcribing and extracting metadata from a non-transcribed source media, the code comprising instructions for:

extracting an audio stream from the non-transcribed source media by a processor-based server;

speech recognition processing of the audio stream by a speech recognition engine to transcribe the audio stream into a time-aligned textual transcription to provide a time-aligned machine transcribed media;

extracting time-aligned audio frames from the audio stream by an audio frame engine;

processing the time-aligned audio frames to extract audio amplitudes by a timed interval, to measure aural amplitudes of the extracted audio amplitudes and assign a numerical value to each extracted audio amplitude to provide time-aligned aural amplitudes by a server processor;

generating an audio histogram of the audio stream by the server processor;

normalizing the audio stream to a single, normalized, universal amplitude scale by determining a loudest frame with a loudest sound and a softest frame with a softest sound within the audio stream by the server processor;

assigning a normalized minimum amplitude value to the softest frame of the audio stream and a normalized maximum amplitude value to the loudest frame of the audio stream;

comparing each frame of the audio stream to the loudest frame and the softest frame by utilizing the audio histogram and assigning a normalized amplitude value between the normalized minimum amplitude value and the normalized maximum amplitude value to said each frame in accordance with a result of the comparison;

processing the time-aligned machine transcribed media by the server processor to extract time-aligned textual metadata associated with the source media; and storing the time-aligned machine transcribed media, the time-aligned audio frames, the time-aligned aural amplitudes, time-aligned textual metadata and the normalized amplitude value of each frame of the audio stream in a database.

15. The computer readable medium of claim 14, wherein said computer executable code further comprises instructions for:

performing a textual sentiment analysis on a full or a segment of the time-aligned textual transcription by the server processor to extract time-aligned sentiment metadata;

performing database lookups based on predefined sentiment weighed texts stored in the database; and receiving one or more matched time-aligned sentiment metadata from the database by the server processor.

16. The computer readable medium of claim 14, wherein said computer executable code further comprises instructions for:

performing a natural language processing on a full or a segment of the time-aligned textual transcription by the server processor to extract time-aligned natural language processed metadata related to at least one of the following: an entity, a topic, a key theme, a subject, an individual, and a place;

performing database lookups based on predefined natural language weighed texts stored in the database; and receiving one or more matched time-aligned natural language metadata from the database by the server processor.

17. The computer readable medium of claim 14, wherein said computer executable code further comprises instructions for:

performing a demographic estimation processing on a full or a segment of the time-aligned textual transcription by the server processor to extract time-aligned demographic metadata;

performing database lookups based on predefined word/phrase demographic associations stored in the database; and receiving one or more matched time-aligned demographic metadata from the database by the server processor.

18. The computer readable medium of claim 14, wherein said computer executable code further comprises instructions for:

performing a psychological profile estimation processing on a full or a segment of the time-aligned textual transcription by the server processor to extract time-aligned psychological metadata;
performing database lookups based on predefined word/phrase psychological profile associations stored in the database; and
receiving one or more matched time-aligned psychological metadata from the database by the server processor.

19. The computer readable medium of claim 14, wherein said computer executable code further comprises instructions for generating digital advertising based on one or more time-aligned textual metadata associated with the source media.

20. The computer readable medium of claim 14, wherein said computer executable code further comprises instructions for:
extracting a video stream from the source media by a video frame engine of a processor-based server;
extracting time-aligned video frames from the video stream by the video frame engine;
storing the time-aligned video frames in the database; and
processing the time-aligned video frames by a server processor to extract time-aligned visual metadata associated with the source media.

21. The computer readable medium of claim 14, wherein said computer executable code further comprises instructions for:
an optical character recognition (OCR) analysis on the time-aligned video frames by the server processor to extract time-aligned OCR metadata;
extracting texts from graphics by a timed interval from the time-aligned video frames;
performing database lookups based on a dataset of predefined recognized fonts, letters and languages stored in the database; and
receiving one or more matched time-aligned OCR metadata from the database by the server processor.

22. The computer readable medium of claim 14, wherein said computer executable code further comprises instructions for:
performing a facial recognition analysis on the time-aligned video frames by the server processor to extract time-aligned facial recognition metadata;
extracting facial data points by a timed interval from the time-aligned video frames;
performing database lookups based on a dataset of predefined facial data points for individuals stored in the database; and
receiving one or more matched time-aligned facial metadata from the database by the server processor.

23. The computer readable medium of claim 14, wherein said computer executable code further comprises instructions for:
performing an object recognition analysis on the time-aligned video frames by the server processor to extract time-aligned object recognition metadata;
extracting object data points by a timed interval from the time-aligned video frames;
performing database lookups based on a dataset of predefined object data points for a plurality of objects stored in the database; and
receiving one or more matched time-aligned object metadata from the database by the server processor.

24. A system for transcribing and extracting metadata from a non-transcribed source media, comprising:
a processor based server connected to a communications system to receive and extract an audio stream from the source media, the server comprising:
a speech recognition engine to process the audio stream to transcribe the audio stream into a time-aligned textual transcription to provide a time-aligned machine transcribed media;
an audio frame engine to extract time-aligned audio frames from the audio stream;
a server processor to:
process the time-aligned machine transcribed media to extract time-aligned textual metadata associated with the non-transcribed source media;
process time-aligned audio frames to extract audio amplitudes by a timed interval,
measure aural amplitude of the extracted audio amplitudes;
assign a numerical value to each extracted audio amplitude to provide time-aligned aural amplitudes;
generate an audio histogram of the audio stream;
normalize the audio stream to a single, normalized, universal amplitude scale by determining a loudest frame with a loudest sound and a softest frame with a softest sound within the audio stream;
assign a normalized minimum amplitude value to the softest frame of the audio stream and a normalized maximum amplitude value to the loudest frame of the audio stream;
compare each frame of the audio stream to the loudest frame and the softest frame by utilizing the audio histogram and assign a normalized amplitude value between the normalized minimum amplitude value and the normalized maximum amplitude value to said each frame in accordance with a result of the comparison; and
a database to store the time-aligned machine transcribed media, the time-aligned audio framed, the time-aligned aural amplitudes and the time-aligned textual metadata associated with non-transcribed source media, and to store the normalized amplitude value of each frame of the audio stream.

25. The system of claim 24, wherein the server processor performs a textual sentiment analysis on a full or a segment of the time-aligned textual transcription to extract time-aligned sentiment metadata; performs database lookups based on predefined sentiment weighed texts stored in the database; and receives one or more matched time-aligned sentiment metadata from the database.

26. The system of claim of 24, wherein the server processor performs a natural language processing on a full or a segment of the time-aligned textual transcription to extract time-aligned natural language processed metadata related to at least one of the following: an entity, a topic, a key theme, a subject, an individual, and a place; performs database lookups based on predefined natural language weighed texts stored in the database; and receives one or more matched time-aligned natural language metadata from the database by the server processor.

27. The system of claim 24, wherein the server processor performs a demographic estimation processing on a full or a segment of the time-aligned textual transcription to extract time-aligned demographic metadata; performs database lookups based on predefined word/phrase demographic associations stored in the database; and receives one or more matched time-aligned demographic metadata from the database by the server processor.

28. The system of claim 24, wherein the server processor performs a psychological profile estimation processing on a full or a segment of the time-aligned textual transcription to extract time-aligned psychological metadata; performs database lookups based on predefined word/phrase psychological profile associations stored in the database; and receives one or more matched time-aligned psychological metadata from the database by the server processor.

29. The system of claim 24, wherein the server comprises a video frame engine for extracting a video stream from the source media and extracting time-aligned video frames from the video stream; and wherein the server processor processes the time-aligned video frames to extract time-aligned visual metadata associated with the source media; and wherein the database stores the time-aligned video frames.

30. The system of claim 29, wherein the server processor performs one or more of the following analysis on the time-aligned video frames:
   a) an optical character recognition (OCR) analysis on the time-aligned video frames to extract time-aligned OCR metadata by:
      extracting texts from graphics by a timed interval from the time-aligned video frames;
      performing database lookups based on a dataset of predefined recognized fonts, letters and languages stored in the database; and
      receiving one or more matched time-aligned OCR metadata from the database;
   b) a facial recognition analysis on the time-aligned video frames to extract time-aligned facial recognition metadata by:
      extracting facial data points by a timed interval from the time-aligned video frames;
      performing database lookups based on a dataset of predefined facial data points for individuals stored in the database; and
      receiving one or more matched time-aligned facial metadata from the database;
   c) an object recognition analysis on the time-aligned video frames by the server processor to extract time-aligned object recognition metadata by:
      extracting object data points by a timed interval from the time-aligned video frames;
      performing database lookups based on a dataset of predefined object data points for a plurality of objects stored in the database; and
      receiving one or more matched time-aligned object metadata from the database by the server processor.

* * * * *